(12) United States Patent
Hornbeck et al.

(10) Patent No.: US 10,504,278 B1
(45) Date of Patent: Dec. 10, 2019

(54) BLENDING NEIGHBORING BINS

(71) Applicant: QUALCOMM Incorporated, San Diego, CA (US)

(72) Inventors: Tate Hornbeck, Somerville, MA (US); Jonathan Wicks, Louisville, CO (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/147,237

(22) Filed: Sep. 28, 2018

(51) Int. Cl.
| | |
|---|---|
| *G06T 15/20* | (2011.01) |
| *G06T 11/40* | (2006.01) |
| *G06T 1/20* | (2006.01) |
| *G06F 3/01* | (2006.01) |
| *G09G 5/36* | (2006.01) |

(52) U.S. Cl.
CPC .............. *G06T 15/20* (2013.01); *G06F 3/013* (2013.01); *G06T 1/20* (2013.01); *G06T 11/40* (2013.01); *G09G 5/363* (2013.01); *G09G 2340/0407* (2013.01)

(58) Field of Classification Search
CPC ................................ G06T 15/20; G06F 3/013
See application file for complete search history.

(56) References Cited

U.S. PATENT DOCUMENTS

| | | | |
|---|---|---|---|
| 2002/0008697 A1* | 1/2002 | Deering | G06T 5/006 345/418 |
| 2015/0379663 A1* | 12/2015 | Gruber | G06T 1/20 345/522 |

* cited by examiner

*Primary Examiner* — Jitesh Patel
(74) *Attorney, Agent, or Firm* — Arent Fox, LLP

(57) ABSTRACT

A method, an apparatus, and a computer-readable medium for wireless communication are provided. In one aspect, an example method may include storing a first rendered bin corresponding to a frame into a memory. The example method may include storing a second rendered bin including a first over rendered region into the memory. The example method may include blending the first over rendered region with a region of the first rendered bin to generate a blended region in the first rendered bin.

30 Claims, 20 Drawing Sheets

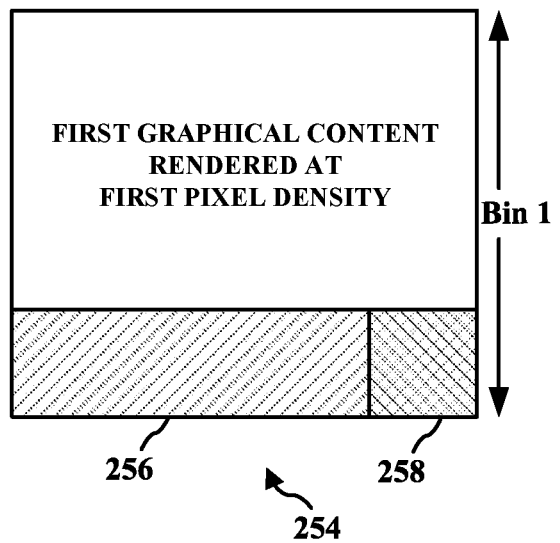
 FIRST BLENDED REGION
 SECOND BLENDED REGION
FIG. 2F

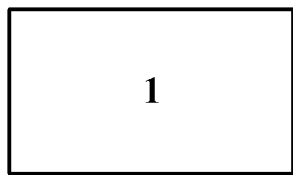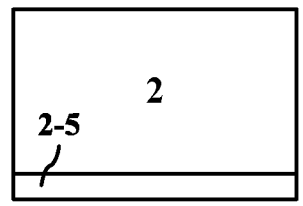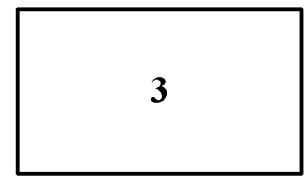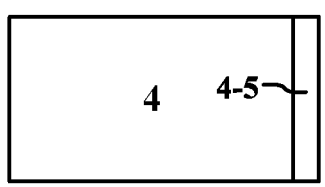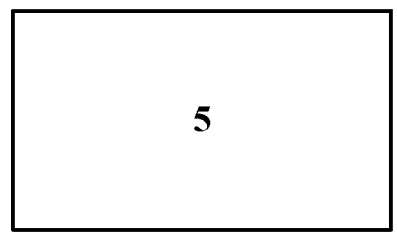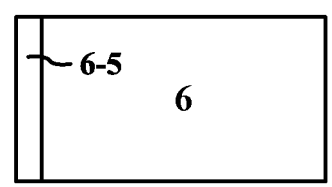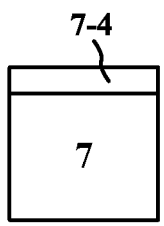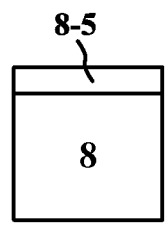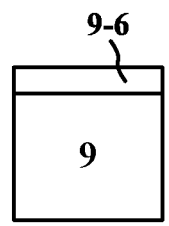
FIG. 2L

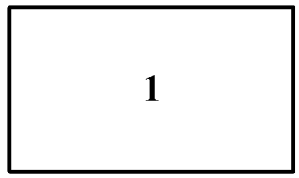
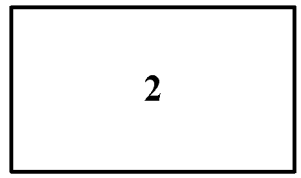
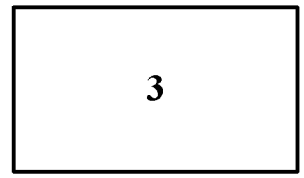
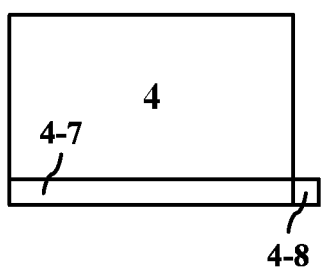
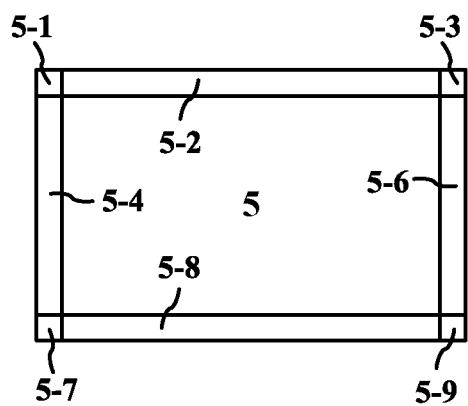
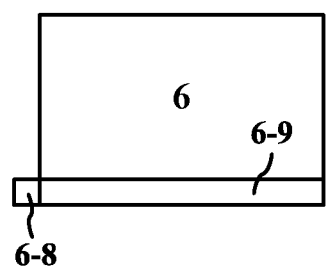
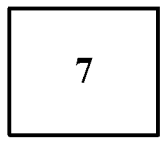
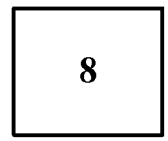
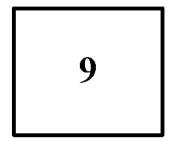
FIG. 2M

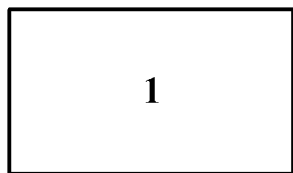
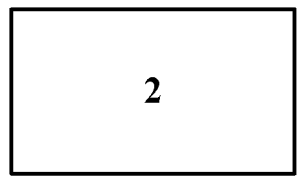
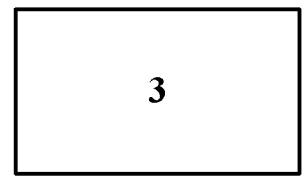
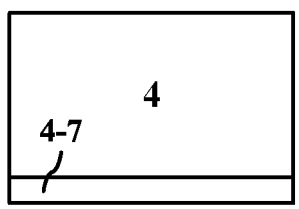
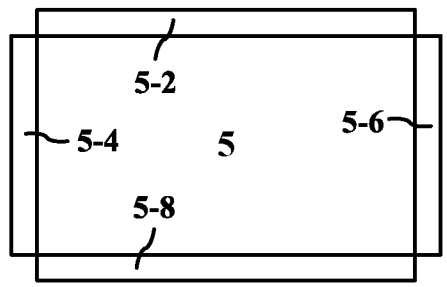
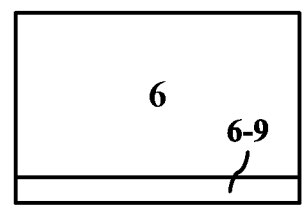
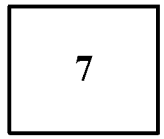
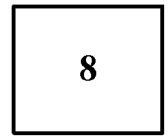
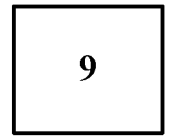
FIG. 2N

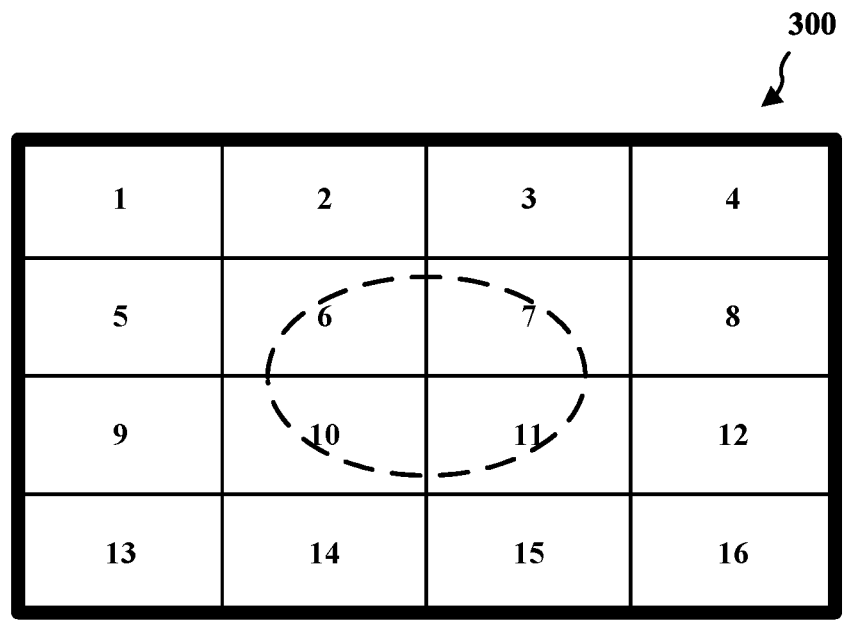
 REPRESENTS FRAME
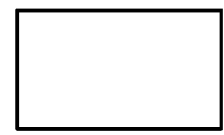 REPRESENTS BIN
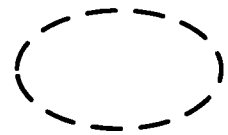 REPRESENTS EYE GAZE REGION
FIG. 3

BLENDING NEIGHBORING BINS

FIELD

The present disclosure generally relates to graphics processing.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes a plurality of processing stages that operate together to execute graphics processing commands/instructions and output a frame. A central processing unit (CPU) may control the operation of the GPU by issuing one or more graphics processing commands/instructions to the GPU. Modern day CPUs are typically capable of concurrently executing multiple applications, each of which may need to utilize the GPU during execution. A device that provides content for visual presentation on a display generally includes a graphics processing unit (GPU).

A GPU renders a frame of graphical content into a framebuffer for display. This rendered frame may be read from the framebuffer and processed by a display processing unit prior to being displayed. For example, the display processing unit may be configured to perform processing on one or more frames that were rendered for display by the GPU and subsequently output the processed frame to a display. The pipeline that includes the CPU, GPU, and display processing unit may be referred to as a display processing pipeline.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to store a first rendered bin corresponding to a frame into a memory. The first rendered bin may include first graphical content at a first pixel density. The apparatus may be configured to store a second rendered bin including a first over rendered region into the memory. The second rendered bin corresponds to the frame. The second rendered bin and the first rendered bin share a first boundary. The second rendered bin includes second graphical content at a second pixel density and the first over rendered region includes a portion of the first graphical content at the second pixel density. The first over rendered region extends beyond the first boundary. The apparatus may be configured to blend the first over rendered region with a region of the first rendered bin to generate a blended region in the first rendered bin. The blended region includes the portion of the first graphical content at a third pixel density. The third pixel density is between the first pixel density and the second pixel density.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 illustrates an example frame with an eye gaze region overlapping a plurality of bins.

DETAILED DESCRIPTION

Figure 1A:
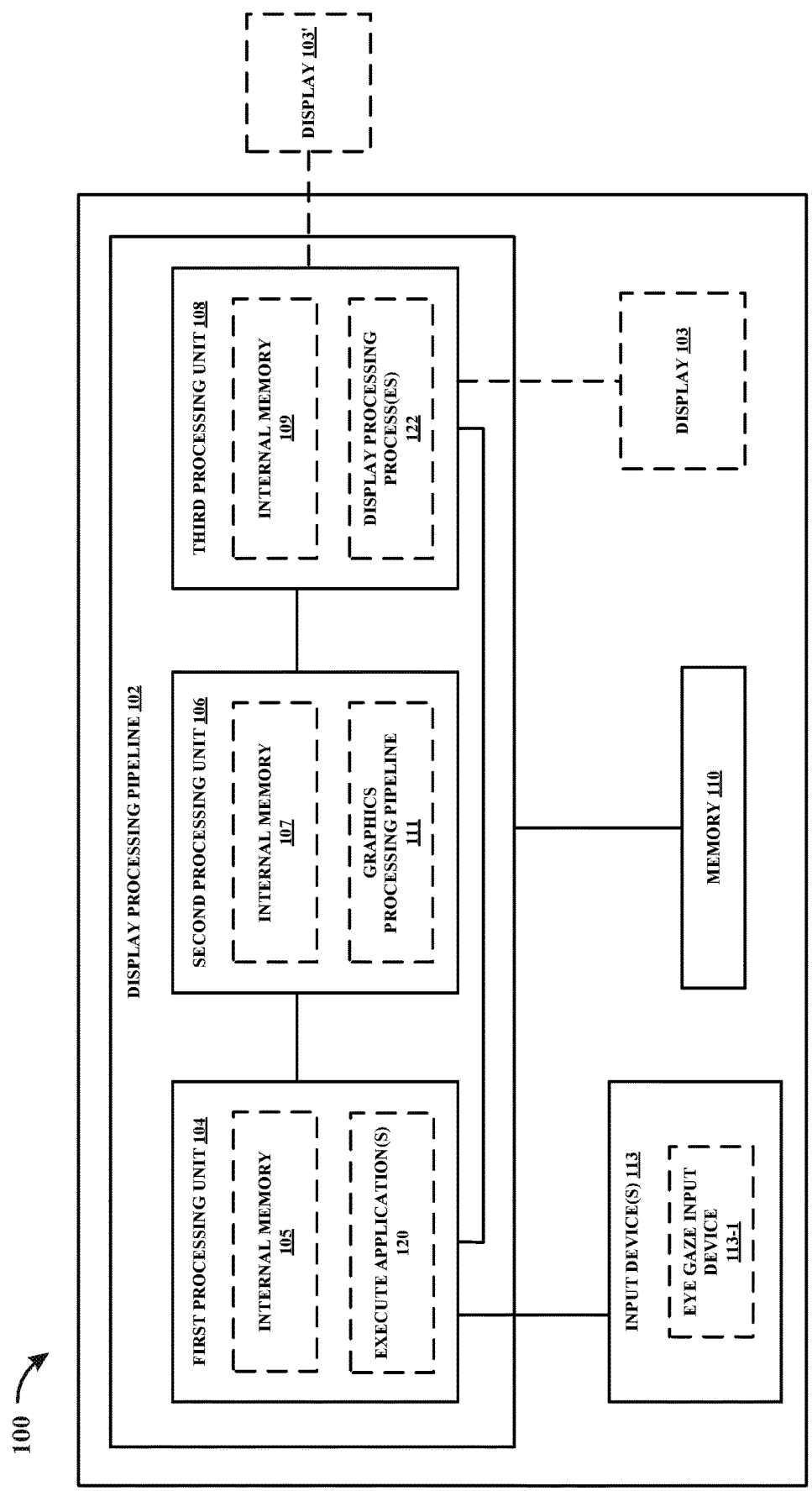
FIG. 1A is a block diagram that illustrates an example device configured to perform one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description.

The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a GPU) may provide content, such as a frame, to a second component (e.g., a display processing unit). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1A is a block diagram that illustrates an example device 100 configured to perform one or more techniques of this disclosure. The device 100 includes display processing pipeline 102 configured to perform one or more technique of this disclosure. In accordance with the techniques described herein, the display processing pipeline 102 may be configured to generate content destined for display. The display processing pipeline 102 may be communicatively coupled to a display 103. In the example of FIG. 1A, the display 103 is a display of the device 100. However, in other examples, the display 103 may be a display external to the device 100 (as shown in FIG. 1 with display 103'). Reference to display 103 may refer to display 103 or display 103' (i.e., a display of the device or a display external to the device).

In examples where the display 103 is not external to the device 100, the a component of the device may be configured to transmit or otherwise provide commands and/or content to the display 103 for presentment thereon. In examples where the display 103 is external to the device 100, the device 100 may be configured to transmit or otherwise provide commands and/or content to the display 103 for presentment thereon. As used herein, "commands," "instructions," and "code" may be used interchangeably. In some examples, the display 103 of the device 100 may represent a display projector configured to project content, such as onto a viewing medium (e.g., a screen, a wall, or any other viewing medium). In some examples, the display 103 may include one or more of: a liquid crystal display (LCD), a plasma display, an organic light emitting diode (OLED) display, a projection display device, an augmented reality (AR) display device, a virtual reality (VR) display device, a head-mounted display, a wearable display, or any other type of display.

In some examples, the display 103 represents a first display and a second display, where the first display is for presenting display content for a left eye of a user and the second display is for presenting display content for a right eye of a user. In such examples, the first display and the second display may be respectively referred to as a left eye display and a right eye display. In some examples, the display 103 may be a video mode display. In other examples, the display 103 may be a command mode display.

The display processing pipeline 102 may include one or more components (or circuits) configured to perform one or more techniques of this disclosure. As used herein, reference to the display processing pipeline being configured to perform any function, technique, or the like refers to one or more components of the display processing pipeline being configured to form such any function, technique, or the like.

In the example of FIG. 1A, the display processing pipeline 102 includes a first processing unit 104, a second processing unit 106, and a third processing unit 108. In some examples, the first processing unit 104 may be configured to execute one or more applications 120, the second processing unit 106 may be configured to perform graphics processing, and the third processing unit 108 may be configured to perform display processing. In such examples, the first processing unit 104 may be a central processing unit (CPU), the second processing unit 106 may be a graphics processing unit (GPU) or a general purpose GPU (GPGPU), and the third processing unit 108 may be a display processing unit, which may also be referred to as a display processor. In other examples, the first processing unit 104, the second processing unit 106, and the third processing unit 108 may each be any processing unit configured to perform one or more feature described with respect to each processing unit.

Figure 1B:
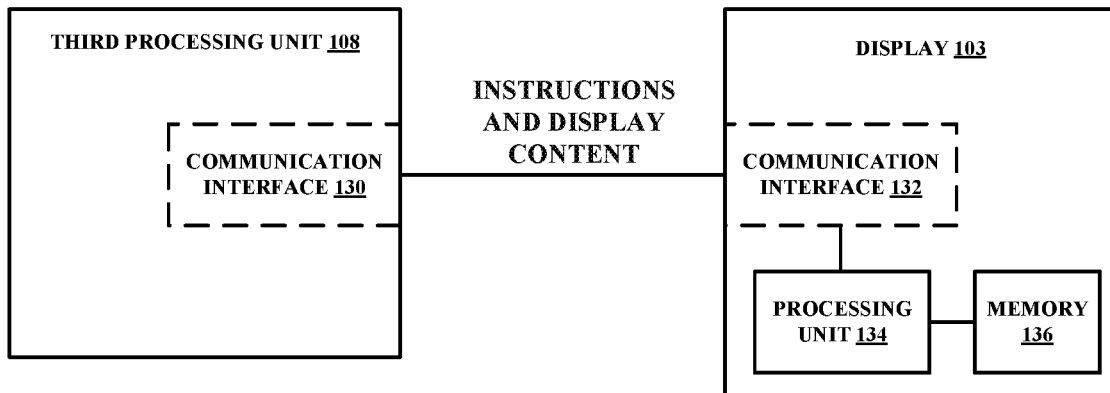
FIG. 1B is a block diagram that illustrates an example configuration between a component of the device depicted in FIG. 1A and a display.

FIG. 1B is a block diagram that illustrates an example configuration between the third processing unit 108 of the device and the display 103. The example of display 103 in FIG. 1B is an example of a smart panel or a command mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The third processing unit 108 may also be configured to provide commands/instructions to the display 103, such as when the display 103 is a command mode display. The display 103 may include a processing unit 134 and a memory 136 accessible by the processing unit 134. The processing unit 134 may be referred to as a display controller. The memory 136 may be configured to store data that the display 103 receives from the third processing unit 108. For example, the memory 136 may be configured to store (e.g., buffer) frames received from the third processing unit 108. The processing unit 134 may be configured to read data stored in the memory 136 that was received from the third processing unit 108 and drive the display 103 based on one or more commands received from the third processing unit 108.

Figure 1C:
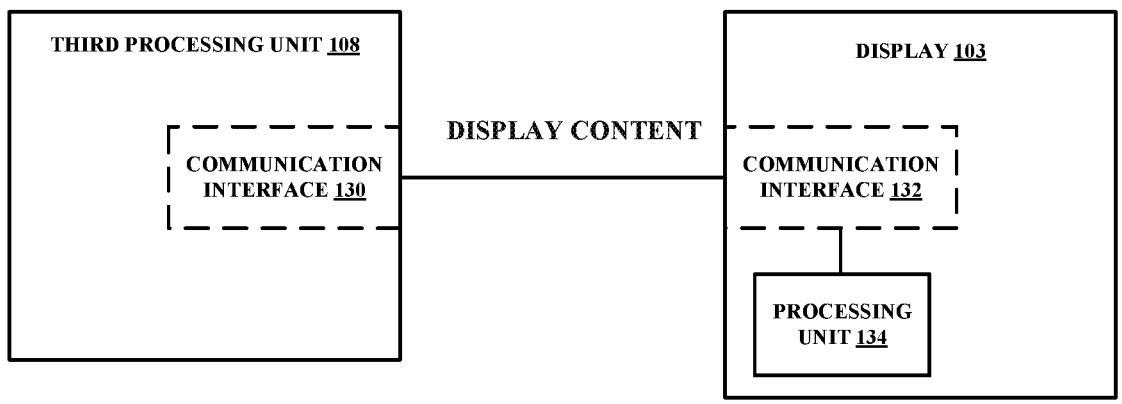
FIG. 1C is a block diagram that illustrates an example configuration between a component of the device depicted in FIG. 1A and a display.

FIG. 1C is a block diagram that illustrates an example configuration between the third processing unit 108 of the device and the display 103. The example of display 103 in FIG. 1C is an example of a dumb panel or a video mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The display 103 may include a processing unit 134 and may not include a memory. The processing unit 134 may be referred to as a display driver. The processing unit 134 may be configured to cause the display content received from the third processing unit 108 to be displayed on the display 103.

Referring back to FIG. 1A, the first processing unit may include an internal memory 105. The second processing unit 106 may include an internal memory 107. In some examples, the internal memory 107 may be referred to as a GMEM. The third processing unit 108 may include an internal memory 109. One or more of the processing units 104, 106, and 108 of the display processing pipeline 102 may be communicatively coupled to a memory 110. The memory 110 may be external to the one or more of the processing units 104, 106, and 108 of the display processing pipeline 102. For example, the memory 110 may be a system memory. The system memory may be a system memory of the device 100 that is accessible by one or more components of the device 100. For example, the first processing unit 104 may be configured to read from and/or write to the memory 110. The second processing unit 106 may be configured to read from and/or write to the memory 110. The third processing unit 108 may be configured to read from and/or write to the memory 110. The first processing unit 104, the second processing unit 106, and the third processing unit 108 may be communicatively coupled to the memory 110 over a bus. In some examples, the one or more components of the display processing pipeline 102 may be communicatively coupled to each other over the bus or a different connection. In other examples, the system memory may be a memory external to the device 100.

The internal memory 105, the internal memory 107, the internal memory 109, and/or the memory 110 may include one or more volatile or non-volatile memories or storage devices. In some examples, the internal memory 105, the internal memory 107, the internal memory 109, and/or the memory 110 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 105, the internal memory 107, the internal memory 109, and/or the memory 110 may be a non-transitory storage medium according to some examples. The term "non-transitory" may indicate that the storage medium is not embodied in a carrier wave or a propagated signal. However, the term "non-transitory" should not be interpreted to mean that the internal memory 105, the internal memory 107, the internal memory 109, and/or the memory 110 is non-movable or that its contents are static. As one example, the memory 110 may be removed from the device 100 and moved to another device. As another example, the memory 110 may not be removable from the device 100.

In some examples, the first processing unit 104 may be configured to perform any technique described herein with respect to the second processing unit 106. In such examples, the display processing pipeline 102 may only include the first processing unit 104 and the third processing unit 108. Alternatively, the display processing pipeline 102 may still include the second processing unit 106, but one or more of the techniques described herein with respect to the second processing unit 106 may instead be performed by the first processing unit 104.

In some examples, the first processing unit 104 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the first processing unit 104.

In some examples, the second processing unit 106 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the second processing unit 106.

The first processing unit 104 may be configured to execute one or more applications 120. The first processing unit 104 may be configured to provide one or more commands/instructions (e.g., draw instructions) to the second processing unit 106 to cause the second processing unit 106 to generate graphical content. As used herein, "commands," "instructions," and "code" may be used interchangeably. For example, execution of an application of the one or more applications 120 may cause one or more commands/instructions (e.g., draw instructions) corresponding to the application to be provided to the second processing unit 106 to generate graphical content for the application. In some examples, an application may be software (e.g., code) stored in the internal memory 105. In other examples, an application may be software stored in the memory 110 or another memory accessible to the first processing unit 104. In other examples, an application may be software stored in a plurality of memories, such as the internal memory 105 and the memory 110.

The second processing unit 106 may be configured to perform graphics processing in accordance with the techniques described herein, such as in a graphics processing pipeline 111. Otherwise described, the second processing unit 106 may be configured to perform any process described herein with respect to the second processing unit 106. For example, the second processing unit 106 may be configured to generate graphical content using tile-based rendering (also referring to as "binning"), direct rendering, adaptive rendering, foveated rendering, and/or any graphics processing technique.

In tile-based rendering, the second processing unit 106 may be configured to divide a buffer (e.g., a framebuffer) into a plurality of sub-regions referred to as bins or tile. For example, if the internal memory 107 is able to store N memory units of data (where N is a positive integer), then a scene may be divided into bins such that the pixel data contained in each bins is less than or equal to N memory units. In some examples, dividing a buffer into a plurality of bins may be referred to as dividing a frame into a plurality of bins. In this way, the second processing unit 106 may render a scene by dividing the scene into bins that can be individually rendered into the internal memory 107, store each rendered bin from internal memory 107 to a buffer (which may be located in the memory 110), and repeat the rendering and storing for each bin of the scene. A rendered frame is the combination of all the rendered bins. Rendering a bin into the internal memory 107 may include executing commands to render the primitives in the associated bin into the internal memory 107. The buffer that stores the rendered frame (i.e., all rendered bins corresponding to the frame) may be referred to as the framebuffer. The framebuffer is allocated memory that holds one or more rendered frames that can be read by one or more other components, such as the third processing unit 108. Therefore, reference to dividing a framebuffer, a frame, or a scene into a plurality of sub-regions refers to configuring the second processing unit 106 to render graphical content corresponding to a frame on a bin-by-bin basis.

As described herein, the bins defined during the binning pass may be synonyms for bins/tiles of a rendered frame (which may be referred to as the rendered scene). For example, each rendered bin may represent a portion of a rendered frame. The bins making up a scene can each be associated with a bin in memory that stores the graphical content included in each respective bin. A bin may be a portion of a memory that stores a portion of a rendered frame.

Tile-based rendering generally includes two passes: a binning pass and a rendering pass. During the binning pass, the second processing unit 106 may be configured to receive and process draw commands for a particular scene in preparation for rendering the scene into a frame. A draw command may include one or more primitives. A primitive may have one or more vertices. The second processing unit 106 may be configured to generate position data (e.g., coordinate data, such as three-axis (X, Y, Z) coordinate data) in screen space for each vertex of each primitive in the draw commands for a particular scene. During the binning pass, the second processing unit 106 may be configured to divide a buffer into which a frame is to be rendered into a plurality bins. In some examples, the second processing unit 106 may be configured to generate visibility information for each bin of the plurality of bins during the binning pass. The second processing unit 106 may be configured to generate visibility information on a per bin basis (e.g., visibility information is generated for each bin).

After generating visibility information for each bin (e.g., during the binning pass), the second processing unit 106 may be configured to separately render each respective bin of the plurality of bins using the respective visibility information for each respective bin. In some examples, the second processing unit 106 may be configured to use the visibility stream generated during the binning pass to refrain from rendering primitives identified as invisible during the binning pass, which avoids overdraw. Accordingly, only the visible primitives and/or the possibly visible primitives are rendered into each bin.

During the rendering of each bin, the second processing unit 106 may be configured to store the pixel values corresponding to the bin being rendered in the internal memory 107. In this way, tile-based rendering may use the internal memory 107 of the second processing unit 106. The second processing unit 106 may be configured to store (e.g., copy) a rendered bin stored in the internal memory 107 to a memory external to the second processing unit 106, such as memory 110. In some examples, once a bin is fully rendered into the internal memory 107, the second processing unit 106 may be configured to store the fully rendered bin to a memory external to the second processing unit 106. In other examples, the second processing unit 106 may be configured to render graphical content for a bin into the internal memory 107 and store graphical content rendered into the internal memory 107 into a memory external to the second processing unit 106 in parallel. Accordingly, while the second processing unit 106 can render graphical content on a bin-by-bin basis, graphical content rendered on a bin-by-bin basis into the internal memory 107 may be subsequently stored in the framebuffer (e.g., allocated in the memory 110).

As used herein, "visibility information" may, in some examples, refer to any information in any data structure that indicates whether one or more primitives is visible and/or may be visible (e.g., possibly visible) with respect to the bin for which the visibility information was generated. Whether a primitive is visible/possibly visible or not visible may, as described herein, respectively refer to whether the primitive will be rendered or not rendered with respect to the bin for which the visibility information was generated. As used herein, a primitive that "may be visible" (e.g., a possibly visible primitive) may refer to the fact that it is unknown whether the primitive will be visible or will not be visible in the rendered frame (i.e., in the respective rendered bin of the rendered frame) at a particular processing point in the graphics processing pipeline (e.g., during the binning pass before the rendering pass) according to one examples. In another example, a primitive that "may be visible" (e.g., a possibly visible primitive) may refer to a primitive that is not or will not be definitively visible in the rendered frame (i.e., in the respective rendered bin of the rendered frame) at a particular processing point in the graphics processing pipeline (e.g., during the binning pass before the rendering pass).

For example, "visibility information" may refer to any information in any data structure that indicates whether one or more primitives associated with one or more draw commands is visible and/or may be visible with respect to the bin. As another example, "visibility information" may be described as a visibility stream that includes a sequence of 1's and 0's with each "1" or "0" being associated with a particular primitive located within the bin. In some examples, each "1" may indicate that the primitive respectively associated therewith is or may be visible in the rendered frame (i.e., in the respective rendered bin of the rendered frame), and each "0" may indicate that the primitive respectively associated therewith will not be visible in the rendered frame (i.e., in the respective rendered bin of the rendered frame). In other examples, each "0" may indicate that the primitive respectively associated therewith is or may be visible in the rendered frame (i.e., in respective the rendered bin of the rendered frame), and each "1" may indicate that the primitive respectively associated therewith will not be visible in the rendered frame (i.e., in the respective rendered bin of the rendered frame). In other examples, "visibility information" may refer to a data structure comprising visibility information in a format different from a visibility stream.

In direct rendering mode, the second processing unit 106 may be configured to render directly to the framebuffer (e.g., a memory location in memory 110) in one pass. Otherwise described, the second processing unit 106 may be configured to render graphical content to the framebuffer without using the internal memory 107 for intermediate storage of rendered graphical content. In some examples, direct rendering mode may be considered as a single bin in accordance with how tile-based rendering is performed, except that the entire framebuffer is treated as a single bin. As referred to herein, a rendering mode (e.g., a direct rendering mode, a tile-based rendering mode, an adaptive rendering mode, and a foveated rendering mode) may refer to the second processing unit 106 being configured to perform one or more techniques associated with the rendering mode. One or more rendering modes described herein may be combined.

In adaptive rendering mode, the second processing unit 106 may be configured to combine one or more techniques of tile-based rendering and one or more techniques of direct rendering. For example, in adaptive rendering, one or more bins may be rendered to the internal memory 107 and subsequently stored from the internal memory 107 to the framebuffer in a memory external to the second processing unit 106 (e.g., the bins that are rendered using tile-based rendering mode), and one or more bins may be rendered directly to the framebuffer in the memory external to the second processing unit 106 (e.g., the bins that are rendered using direct rendering mode). The second processing unit 106 may be configured to render bins that are to be rendered using direct rendering using the visibility information generated during the binning pass for these respective bins and the rendering of these direct rendered bins may occur in one rendering pass. Conversely, the second processing unit 106 may be configured to render bins that are to be rendered using tile-based rendering using the visibility information generated during the binning pass for these respective bins and the rendering of these tile-based rendered bins may occur in multiple rendering passes (e.g., a respective rendering pass for each respective bin of the bins that are rendered using tile-based rendering).

In foveated rendering mode, the second processing unit 106 may be configured to render graphical content of a frame based on information indicative of an eye gaze region.

The human vision system results in high resolution vision in the fovea (the central vision area, which is where a person is looking) and low resolution in the peripheral region around the fovea. Foveated rendering leverages how the human vision system works by rendering graphical content corresponding to an eye gaze region at a high resolution, and rendering graphical content corresponding the peripheral region around the eye gaze region at a low resolution. By reducing the resolution in the peripheral region, the computational load of the second processing unit 106 may be reduced, thus resulting in more efficient processing.

In some examples, rendering graphical content to a framebuffer may refer to writing pixel values to the framebuffer. A pixel value may have one or more components, such as one or more color components. Each component may have a corresponding value. For example, a pixel in the red, green, and blue color space may have a red color component value, a green color component value, and a blue color component value.

The third processing unit 108 may be configured to perform one or more display processing processes 122 in accordance with the techniques described herein. For example, the third processing unit 108 may be configured to perform one or more display processing techniques on one or more frames generated by the second processing unit 106 before presentment by the display 103. Otherwise described, the third processing unit 108 may be configured to perform display processing. In some examples, the one or more display processing processes 122 may include one or more of a rotation operation, a blending operation, a scaling operating, any display processing process/operation, or any process/operation described herein with respect to the third processing unit 108.

In some examples, the one or more display processing processes 122 include any process/operation described herein with respect to the third processing unit 108. The display 103 may be configured to display content that was generated using the display processing pipeline 102. For example, the second processing unit 106 may generate graphical content based on commands/instructions received from the first processing unit 104. The graphical content may include one or more layers. Each of these layers may constitute a frame of graphical content. The third processing unit 108 may be configured to perform composition on graphical content rendered by the second processing unit 106 to generate display content. Display content my constitute a frame for display. The frame for display may include two or more layers/frames that were blended together by the third processing unit 108.

The device 100 may include or be connected to one or more input devices 113. In some examples, the one or more input devices 113 may include one or more of: a touch screen, a mouse, a peripheral device, an audio input device (e.g., a microphone or any other visual input device), an eye gaze input device (which may be referred to as an eye gaze tracker, an eye tracker, an eye gaze sensor, eye movement tracker, an eye movement sensor, an eye sensor, or the like), a visual input device (e.g., a camera, an eye tracker, or any other visual input device), any user input device, or any input device configured to receive an input from a user. In some examples, the display 103 may be a touch screen display; and, in such examples, the display 103 constitutes an example input device 113.

In the example of FIG. 1A, the one or more input devices 113 is shown as including an eye gaze input device 113-1. The eye gaze input device 113-1 may be configured to determine where a user of device 100 is looking, such as where a user is looking on a display (e.g., the display 103). Otherwise described, the eye gaze input device 113-1 may be configured to generate information indicative of an eye gaze region. The eye gaze region may be a region where the user of the device 100 is looking. In some examples, the eye gaze region may be referred to as a fovea/foveated region or a fixation point region. The information indicative of an eye gaze region may include information indicative of one or more regions, such as the eye gaze region (e.g., a fovea region) and/or one or more regions outside of the eye gaze region (e.g., a peripheral region). In some examples, the peripheral region may be the region that falls outside of the eye gaze region.

The eye gaze input device 113-1 may be configured to provide the information indicative of the eye gaze region to the first processing unit 104 and/or the second processing unit 106. In some examples, the first processing unit 104 may be configured to receive the information indicative of the eye gaze region from the eye gaze input device 113-1 and further process the information to generate processed information indicative of the eye gaze region. For example, the first processing unit 104 may be configured to adjust the size of the eye gaze region corresponding to the information indicative of the eye gaze region received from the eye gaze input device 113-1. In other examples, the first processing unit 104 may be configured to receive the information indicative of the eye gaze region from the eye gaze input device 113-1 and forward it to the second processing unit 106. In accordance with the techniques described herein, the second processing unit 106 may be configured to receive information indicative of an eye gaze region from any component, such as the first processing unit 104 or the eye gaze input device 113-1. The information indicative of an eye gaze region received by the second processing unit 106 may be generated by the eye gaze input device 113-1 and processed by zero or more other components before being received by the second processing unit 106.

The output of an input device may constitute an input to a component receiving the output from the input device. The eye gaze input device 113-1 may be integrated with the device 100 so that the eye gaze input device 113-1 is configured to detect where a user is looking relative to the display 103.

The display processing pipeline 102 may be configured to execute one or more applications. For example, the first processing unit 104 may be configured to execute one or more applications 120. The first processing unit 104 may be configured to cause the second processing unit 106 to generate content for the one or more applications 120 being executed by the first processing unit 104. Otherwise described, execution of the one or more applications 120 by the first processing unit 104 may cause the generation of graphical content by a graphics processing pipeline 111. For example, the first processing unit 104 may issue or otherwise provide instructions (e.g., draw instructions) to the second processing unit 106 that cause the second processing unit 106 to generate graphical content based on the instructions received from the first processing unit 104. The second processing unit 106 may be configured to generate one or more layers for each application of the one or more applications 120 executed by the first processing unit 104. Each layer generated by the second processing unit 106 may be stored in a buffer (e.g., a framebuffer). Otherwise described, the buffer may be configured to store one or more layers of graphical content rendered by the second processing unit 106. The buffer may reside in the internal memory 107 of the second processing unit 106 and/or the memory 110 (which may be system memory of the device 100 in some examples). Each layer produced by the second processing unit 106 may constitute graphical content. The one or more layers may correspond to a single application or a plurality of applications. The second processing unit 106 may be configured to generate multiple layers of content, meaning that the first processing unit 104 may be configured to cause the second processing unit 106 to generate multiple layers of content.

In some examples, one or more components of the device 100 and/or display processing pipeline 102 may be combined into a single component. For example, one or more components of the display processing pipeline 102 may be one or more components of a system on chip (SoC), in which case the display processing pipeline 102 may still include the first processing unit 104, the second processing unit 106, and the third processing unit 108; but as components of the SoC instead of physically separate components. In other examples, one or more components of the display processing pipeline 102 may be physically separate components that are not integrated into a single component. For example, the first processing unit 104, the second processing unit 106, and the third processing unit 108 may each be a physically separate component from each other. It is appreciated that a display processing pipeline may have different configurations. As such, the techniques described herein may improve any display processing pipeline and/or display, not just the specific examples described herein.

In some examples, one or more components of the display processing pipeline 102 may be integrated into a motherboard of the device 100. In some examples, one or more components of the display processing pipeline 102 may be present on a graphics card of the device 100, such as a graphics card that is installed in a port in a motherboard of the device 100 or a graphics card incorporated within a peripheral device configured to interoperate with the device 100.

The first processing unit 104, the second processing unit 106, and/or the third processing unit 108 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. In examples where the techniques described herein are implemented partially in software, the software (instructions, code, or the like) may be stored in a suitable, non-transitory computer-readable storage medium accessible by the processing unit. The processing unit may execute the software in hardware using one or more processors to perform the techniques of this disclosure. For example, one or more components of the display processing pipeline 102 may be configured to execute software. The software executable by the first processing unit 104 may be stored in the internal memory 105 and/or the memory 110. The software executable by the second processing unit 106 may be stored in the internal memory 107 and/or the memory 110. The software executable by the third processing unit 108 may be stored in the internal memory 109 and/or the memory 110.

As described herein, a device, such as the device 100, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality (AR) device, or a virtual reality (VR) device), a non-wearable device (e.g., a non-wearable AR device or a non-wearable VR device), any AR device, any VR device, a display (e.g., display device), a television, a television set-top box, an intermediate network device, a digital media player, a video streaming device, a content streaming device, an in-car computer, any mobile device, any device configured to generate content, or any device configured to perform one or more techniques described herein. In some examples, the device 100 may be an apparatus. The apparatus may be a processing unit, an SOC, or any device.

As described herein, devices, components, or the like may be described herein as being configured to communicate with each other. For example, one or more components of the display processing pipeline 102 may be configured to communicate with one or more other components of the device 100, such as the display 103, the memory 110, and/or one or more other components of the device 100 (e.g., one or more input devices). One or more components of the display processing pipeline 102 may be configured to communicate with each other. For example, the first processing unit 104 may be communicatively coupled to the second processing unit 106 and/or the third processing unit 108. As another example, the second processing unit 106 may be communicatively coupled to the first processing unit 104 and/or the third processing unit 108. As another example, the third processing unit 108 may be communicatively coupled to the first processing unit 104 and/or the second processing unit 106.

As described herein, communication may include the communicating of information from a first component to a second component (or from a first device to a second device). The information may, in some examples, be carried in one or more messages. As an example, a first component in communication with a second component may be described as being communicatively coupled to or otherwise with the second component. For example, the first processing unit 104 and the second processing unit 106 may be communicatively coupled. In such an example, the first processing unit 104 may communicate information to the second processing unit 106 and/or receive information from the second processing unit 106.

In some examples, the term "communicatively coupled" may refer to a communication connection, which may be direct or indirect. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. In some examples, a communication connection may enable the communication of information (e.g., the output of information, the transmission of information, the reception of information, or the like). In some examples, the term "communicatively coupled" may refer to a temporary, intermittent, or permanent communication connection.

Any device or component described herein may be configured to operate in accordance with one or more communication protocols. For example, a first and second component may be communicatively coupled over a connection. The connection may be compliant or otherwise be in accordance with a communication protocol. As used herein, the term "communication protocol" may refer to any communication protocol, such as a communication protocol compliant with a communication standard or the like. As an example, a communication protocol may include the Display Serial Interface (DSI) protocol. DSI may enable communication between the third processing unit 108 and the display 103 over a connection, such as a bus.

In accordance with the techniques described herein, the boundaries between bins having different pixel densities may be smoothed. Otherwise described, the transition between two neighboring bins with different pixel densities may be smoothed in accordance with the techniques described herein. Smoothing a boundary between bins that have different pixel densities reduces or removes the noticeability of the change in quality between the bins at the boundary. The techniques described herein may be used with any rendering mode that uses tile-based rendering. For example, the techniques described herein may be used with tile-based rendering mode, foveated rendering mode, or any other rendering mode that uses tile-based rendering (e.g., tile-based foveated rendering, adaptive rendering for foveated rendering, or any other technique). For example, tile-based foveated rendering introduces boundaries between bins that include graphical content rendered at a first pixel density and bins that include graphical content rendered at a second pixel density. The first pixel density may correspond to a first resolution and the second pixel density may correspond to a second resolution. The first pixel density may be greater than the second pixel density, meaning that the first resolution may be greater than the second resolution. Otherwise described, tile-based foveated rendering introduces boundaries where there is a transition from higher resolution data to lower resolution data. The transition between bins rendered at different quality levels may become more noticeable at the boundaries when the boundaries get closer to the focal point. For example, as the eye tracking technology becomes more accurate, the size of the foveated region may become more accurate resulting in a smaller high resolution area being rendered. A smaller high resolution area corresponding to the foveated region means that the boundaries between high resolution bins and the low resolution bins may be closer to the focal point, which may result in the boundaries being more perceptible. In accordance with the techniques described herein, smoothing a boundary between bins of differing quality reduces or removes the noticeability of the change in quality between the bins.

Figure 2A:
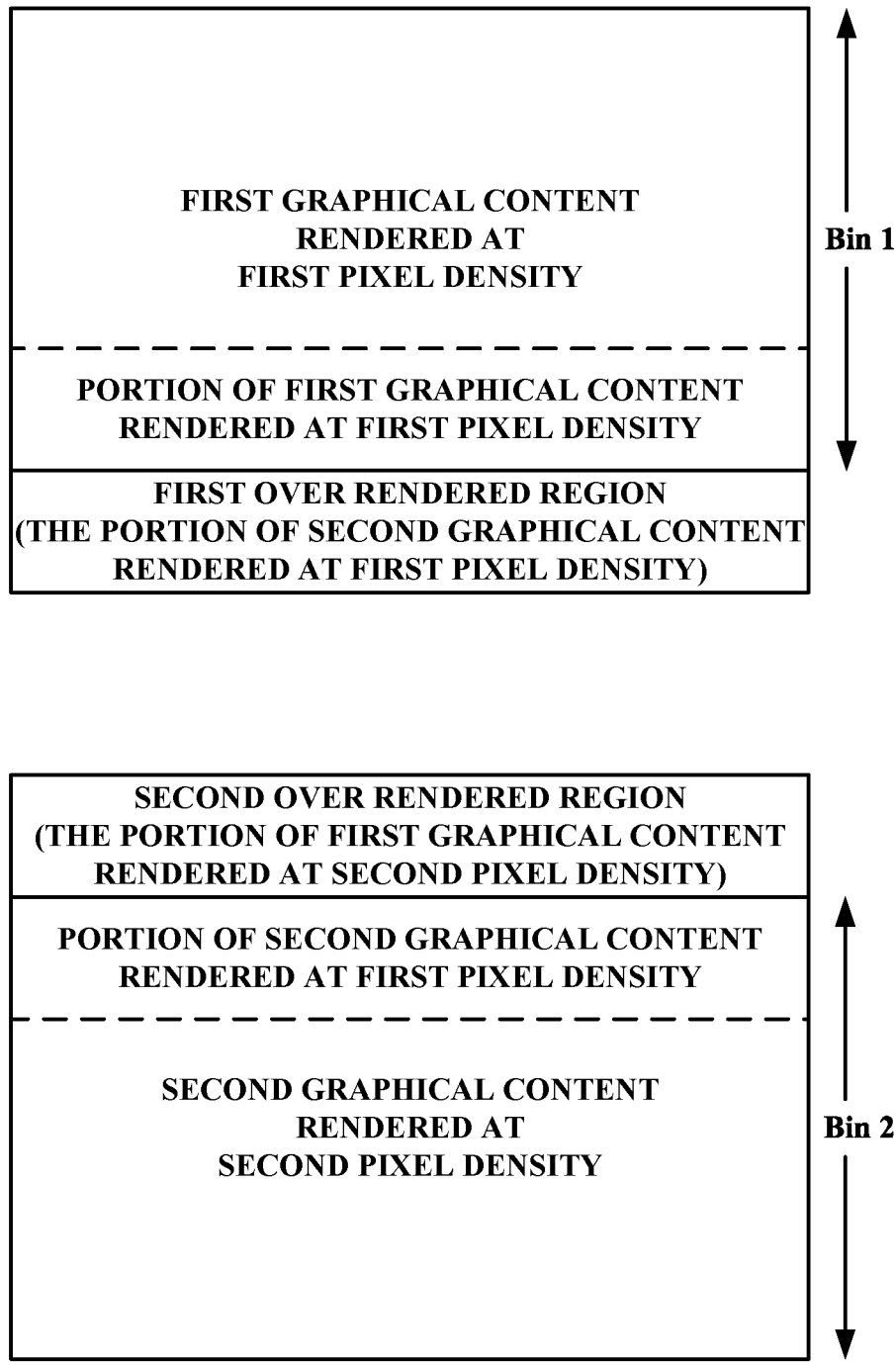
FIGS. 2A-2N illustrate various examples of smoothing the transition between two bins rendered at different quality levels in accordance with one or more techniques of this disclosure.

FIGS. 2A-2N illustrate various examples of smoothing the transition between two bins rendered at different quality levels in accordance with the techniques described herein. The example of FIG. 2A includes two different rendered bins: bin 1 and bin 2. Bins 1 and 2 are adjacent to one another and share one boundary in a frame. In this example, the shared boundary is bottom edge of bin 1 and the top edge of bin 2. Bins 1 and 2 may be referred to as neighboring bins because they are adjacent to each other. For example, bin 1 neighbors bin 2, and bin 2 neighbors bin 1. A neighboring bin may also include a diagonally positioned bin that shares a corner with another bin. Otherwise described, two diagonally positioned bins that share a corner may be referred to as neighboring bins even though the two bins are not adjacent to each other. In some examples, bins 1 and 2 may each be a respective bin of a plurality of bins corresponding to a frame. The plurality of bins may include two or more bins. For example, the second processing unit 106 may be configured to divide a frame into a plurality of bins. The plurality of bins may include bin 1 and bin 2.

In the example FIG. 2A, bins 1 and 2 are each an example of an over rendered bin. An over rendered bin includes graphical content corresponding to a neighboring bin. For example, bin 1 includes first graphical content rendered at a first pixel density and a first over rendered region. The first over rendered region includes a portion of the second graphical content corresponding to bin 2. The first over rendered region starts at the bottom boundary of bin 1 and extends away from the bottom boundary of bin 1. The portion of the second graphical content in the first over rendered region is rendered at the first pixel density. Bin 2 includes second graphical content rendered at a second pixel density and a second over rendered region. The second over rendered region includes a portion of the first graphical content corresponding to bin 1. The second over rendered region starts at the top boundary of bin 2 and extends away from the top boundary of bin 2. The portion of the first graphical content in the second over rendered region is rendered at the second pixel density. In some examples, the first pixel density may be greater than the second pixel density. In other examples, the first pixel density may be less than the second pixel density.

An over rendered region may extend beyond a boundary of a bin by an over render distance. The over render distance may be X pixels, where X is a positive integer. For example, X may be 16 pixels. In other examples, X may be less than 16 pixels. In other examples, X may be greater than 16 pixels. In some examples, X may be equal to or less than Z % of pixels of the bin dimension corresponding to the direction of over rendering (e.g., the direction of extension). For example, referring to FIG. 2A, bin 1 has a length and a width. The over render distance of the first over rendered region in this example may be Z % of the number of pixels corresponding to the width (i.e., the shorter dimension). In some examples, Z may be less than 50%, 25%, 10%, 5%, 2.5%, 1%, 0.5%, or any other percentage.

Figure 2B:
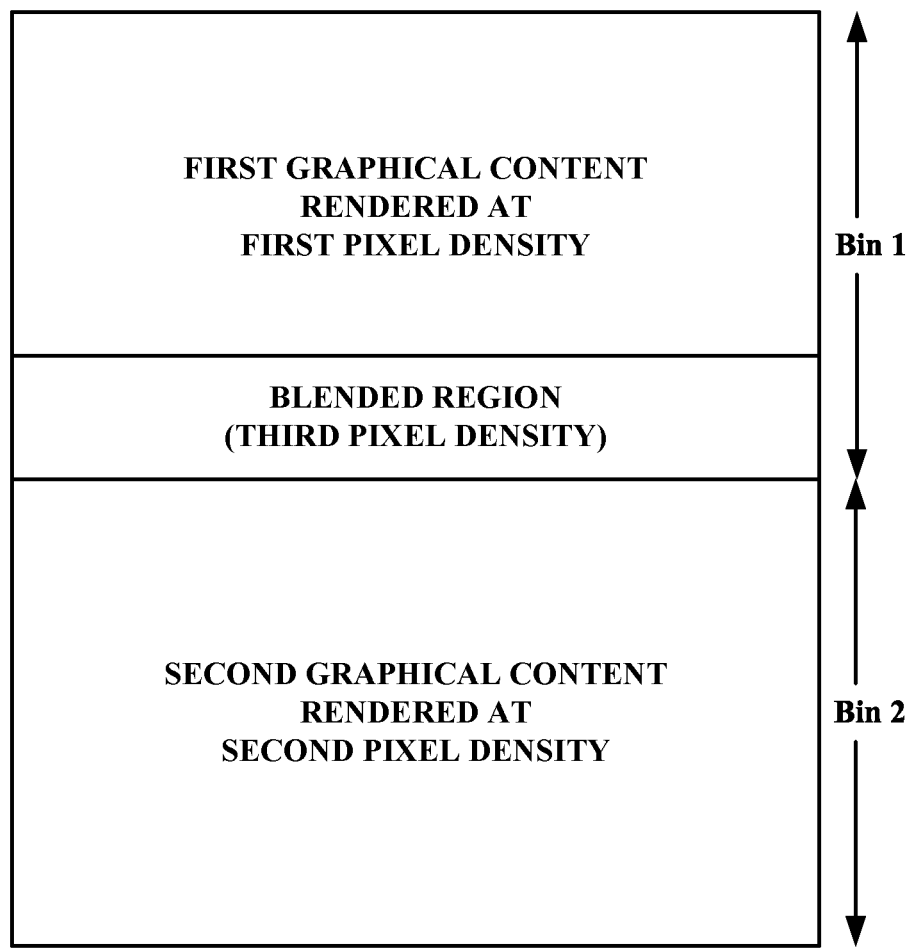

FIG. 2B illustrates an example of blending an over rendered region of one bin with a region of another bin to smooth the transition between the two bins. For example, from the example in FIG. 2A, the second over rendered region may be blended with a region of bin 1 to generate a blended region in bin 1. The region of bin 1 is the region that includes the portion of first graphical content rendered at the first pixel density. The blended region includes the portion of the first graphical content at a third pixel density, which is between the first pixel density and the second pixel density. The third pixel density may be referred to as an intermediate pixel density because it is between the first and second pixel densities. The blended region includes graphical content at two pixel densities (i.e., the first pixel density and the second pixel density in this example) that results in the blended region having the third pixel density. For example, the blended region in FIG. 2B includes a first percentage (N %) of the portion of first graphical content rendered at the first pixel density and a second percentage (M %) of the portion of the first graphical content rendered at the second pixel density, where N+M=100. In some examples, N and M may be equal (i.e., N and M may both be 50%). In other examples, N and M may be unequal. For example, N may be less than 50% and M may be greater than 50%. As another example, N may be greater than 50% and M may be less than 50%.

A blended region may extend into a bin from a boundary of the bin by a blend distance. The blend distance may be Y pixels, where Y is a positive integer. In some examples, the over render distance may be the same as the blend distance. In other examples, the over render distance may be less than or greater than the blend distance. In some examples, Y may be 16 pixels. In other examples, Y may be less than 16 pixels. In other examples, Y may be greater than 16 pixels. In some examples, Y may be equal to or less than W % of pixels of the bin dimension corresponding to the direction of extension. For example, referring to FIG. 2A, bin 1 has a length and a width. The blend distance of the first over rendered region in this example may be W % of the number of pixels corresponding to the width (i.e., the shorter dimension). In some examples, W may be less than 50%, 25%, 10%, 5%, 2.5%, 1%, 0.5%, or any other percentage. In some examples, W may be the same as Z. In other examples, W may be less than or greater than Z.

Referring to FIGS. 2A and 2B, the first pixel density may be less than the second pixel density. In such examples, the blending may be referred to as blending graphical content rendered at a higher pixel density into graphical content rendered at a lower pixel density. In other examples, the first pixel density may be greater than the second pixel density. In such examples, the blending may be referred to as blending graphical content rendered at a lower pixel density into graphical content rendered at a higher pixel density.

Figure 2C:
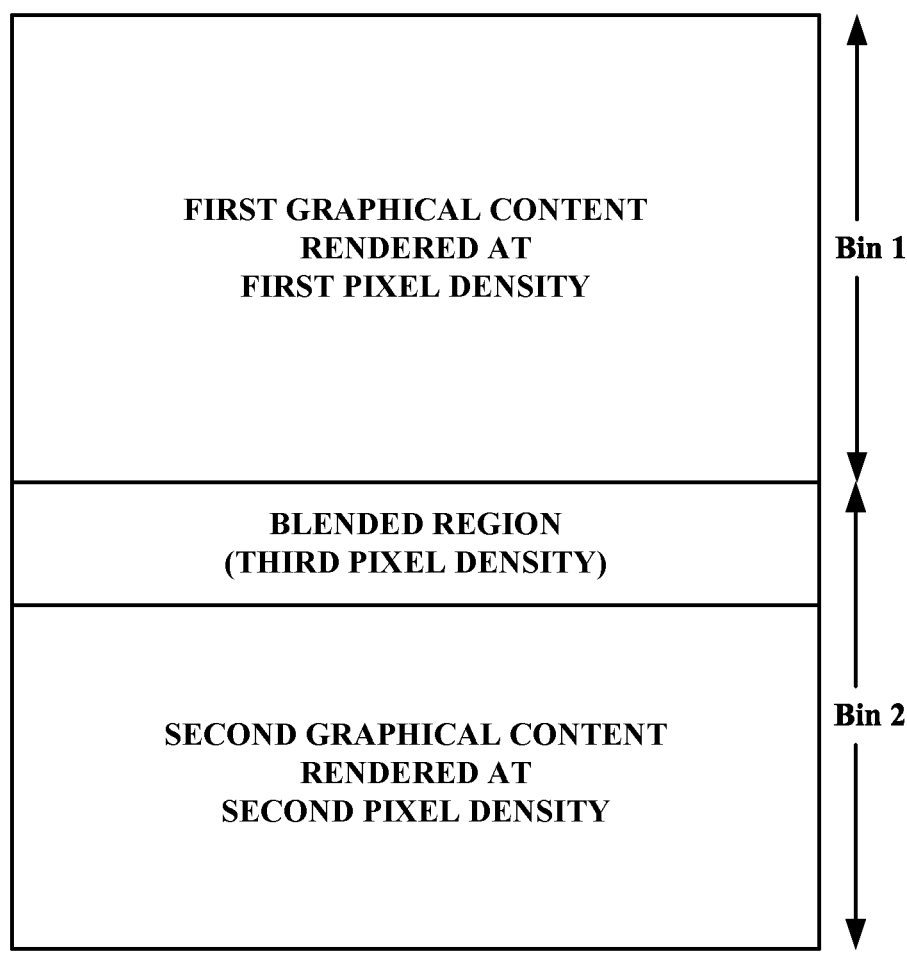

FIG. 2C illustrates an example of blending an over rendered region of one bin with a region of another bin to smooth the transition between the two bins. For example, from the example in FIG. 2A, the first over rendered region may be blended with a region of bin 2 to generate a blended region in bin 2. The region of bin 2 is the region that includes the portion of second graphical content rendered at the second pixel density. The blended region includes the portion of the second graphical content at a third pixel density, which is between the first pixel density and the second pixel density. The third pixel density may be referred to as an intermediate pixel density because it is between the first and second pixel densities. The blended region includes graphical content at two pixel densities (i.e., the first pixel density and the second pixel density in this example) that results in the blended region having the third pixel density. For example, the blended region in FIG. 2C includes a first percentage (N %) of the portion of first graphical content rendered at the first pixel density and a second percentage (M %) of the portion of the first graphical content rendered at the second pixel density, where N+M=100. In some examples, N and M may be equal (i.e., N and M may both be 50%). In other examples, N and M may be unequal. For example, N may be less than 50% and M may be greater than 50%. As another example, N may be greater than 50% and M may be less than 50%.

Referring to FIGS. 2A and 2C, the first pixel density may be greater than the second pixel density. In such examples, the blending may be referred to as blending graphical content rendered at a higher pixel density into graphical content rendered at a lower pixel density. In other examples, the first pixel density may be less than the second pixel density. In such examples, the blending may be referred to as blending graphical content rendered at a lower pixel density into graphical content rendered at a higher pixel density.

Figure 2D:
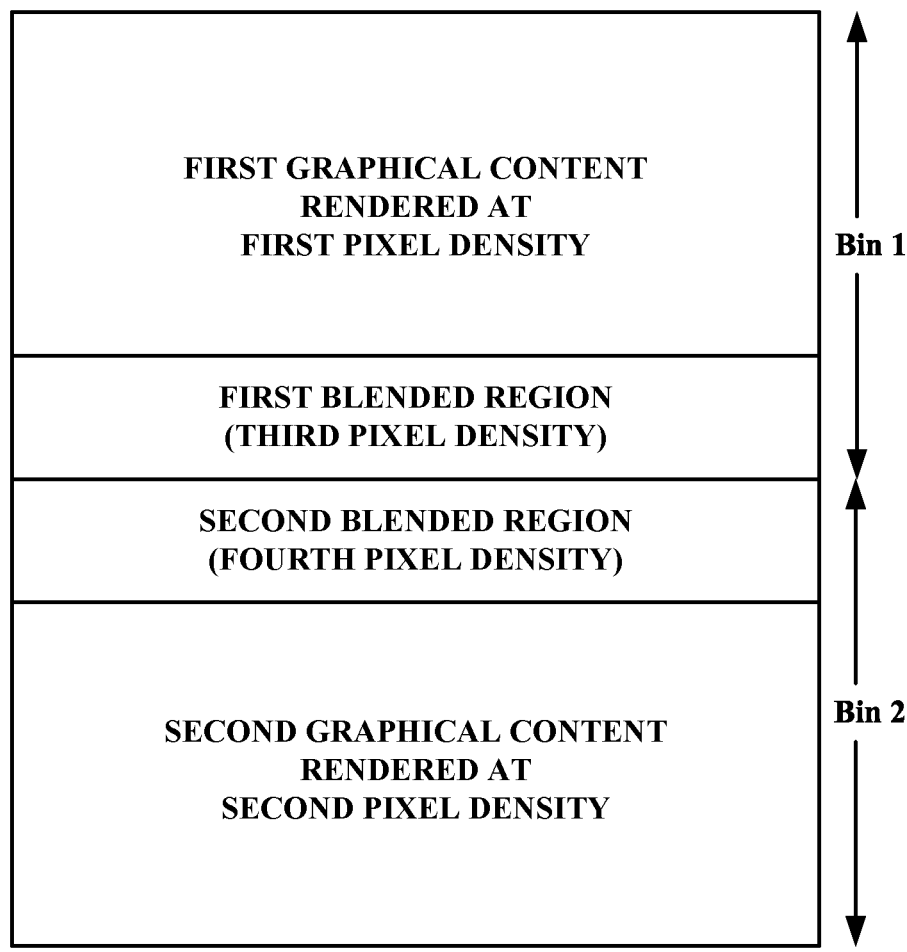

FIG. 2D illustrates an example of blending multiple over rendered regions corresponding to the same boundary. For example, from the example in FIG. 2A, the second over rendered region may be blended with a region of bin 1 to generate a first blended region in bin 1, and the first over rendered region may be blended with a region of bin 2 to generate a second blended region in bin 2. The region of bin 1 is the region that includes the portion of first graphical content rendered at the first pixel density. The first blended region includes the portion of the first graphical content at a third pixel density, which is between the first pixel density and the second pixel density. The region of bin 2 is the region that includes the portion of second graphical content rendered at the second pixel density. The second blended region includes the portion of the second graphical content at a fourth pixel density, which is between the first pixel density and the second pixel density. The third pixel density and the fourth pixel density may each be referred to as an intermediate pixel density because each is between the first and second pixel densities.

The first blended region includes graphical content at two pixel densities (i.e., the first pixel density and the second pixel density in this example) that results in the blended region having the third pixel density. For example, the first blended region in FIG. 2D includes a first percentage (N %) of the portion of first graphical content rendered at the first pixel density and a second percentage (M %) of the portion of the first graphical content rendered at the second pixel density, where N+M=100. In some examples, N and M may be equal (i.e., N and M may both be 50%). In other examples, N and M may be unequal. For example, N may be less than 50% and M may be greater than 50%. As another example, N may be greater than 50% and M may be less than 50%.

The second blended region includes graphical content at two pixel densities (i.e., the first pixel density and the second pixel density in this example) that results in the blended region having the fourth pixel density. For example, the second blended region in FIG. 2D includes a first percentage (R %) of the portion of second graphical content rendered at the first pixel density and a second percentage (S %) of the portion of the second graphical content rendered at the second pixel density, where R+S=100. In some examples, R and S may be equal (i.e., R and S may both be 50%). In other examples, R and S may be unequal. For example, R may be less than 50% and S may be greater than 50%. As another example, R may be greater than 50% and S may be less than 50%. In some examples, the third pixel density may equal the fourth pixel density. In other examples, the third pixel density may be unequal to the fourth pixel density. For example, the third pixel density may be greater than the fourth pixel density. As another example, the third pixel density may be less than the fourth pixel density.

Referring to FIGS. 2A and 2D, the first pixel density may be less than the second pixel density. In such examples, generating the first blended region may be referred to as blending graphical content rendered at a higher pixel density into graphical content rendered at a lower pixel density, and generating the second blended region may be referred to as blending graphical content rendered at a lower pixel density into graphical content rendered at a higher pixel density. In other examples, the first pixel density may be greater than the second pixel density. In such examples, generating the first blended region may be referred to as blending graphical content rendered at a lower pixel density into graphical content rendered at a higher pixel density, and generating the second blended region may be referred to as blending graphical content rendered at a higher pixel density into graphical content rendered at a lower pixel density.

Figure 2E:
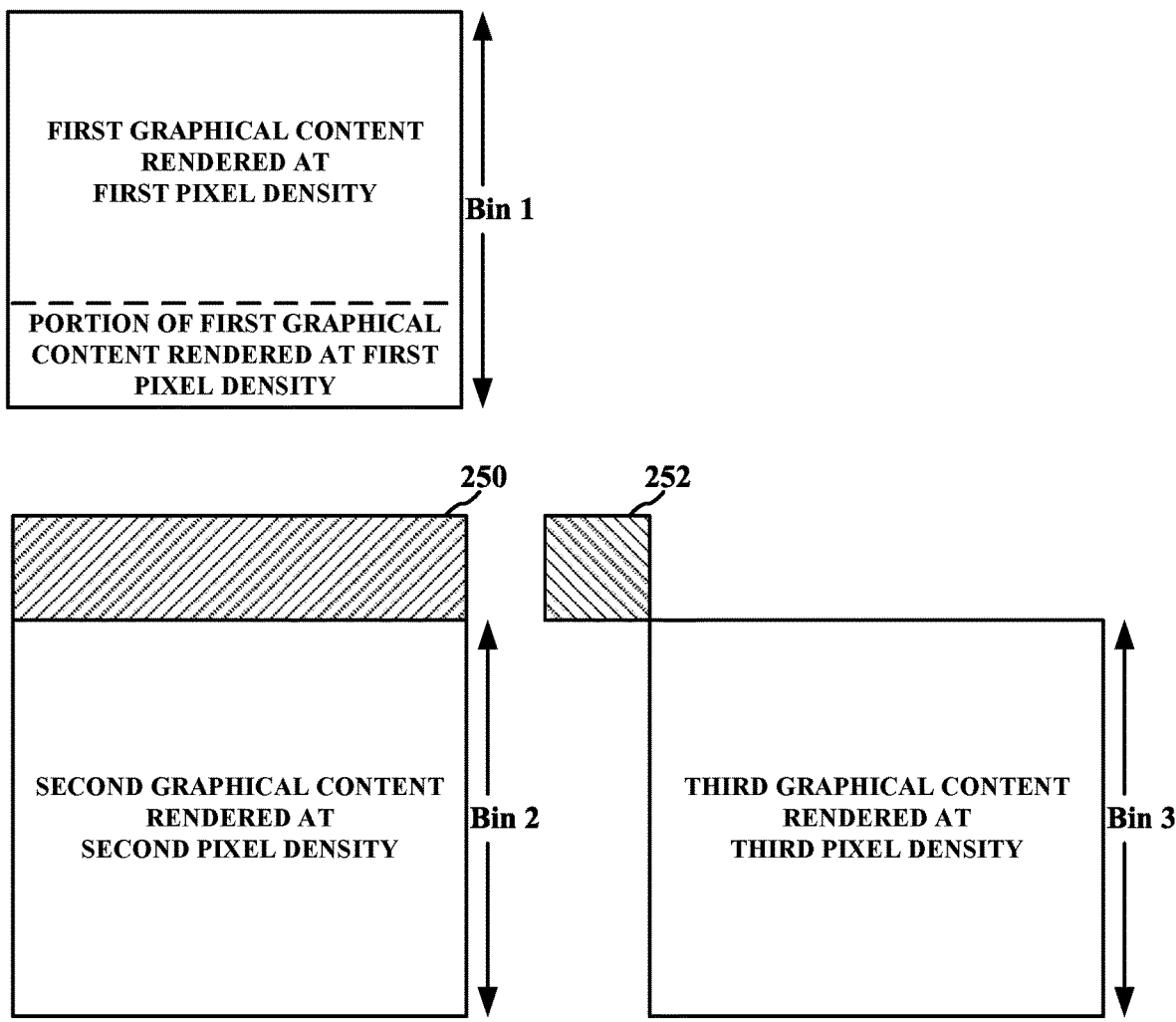

A blended region may include one or more blended areas, as in the example shown in FIGS. 2E and 2F. Otherwise described, a blended region may include graphical content rendered at two or more different pixel densities. The example of FIG. 2E includes three different rendered bins: bin 1, bin 2, and bin 3. Each bin of bins 1-3 is a neighboring bin to the other two bins. In this example, bin 1 shares a boundary with bin 2 and a corner with bin 3. Bins 1-3 may each be a respective bin of a plurality of bins corresponding to a frame. The plurality of bins may include three or more bins. For example, the second processing unit 106 may be configured to divide a frame into a plurality of bins. The plurality of bins may include bins 1-3.

In the example FIG. 2E, bin 1 includes first graphical content rendered at a first pixel density, and bins 2 and 3 are each an example of an over rendered bin. Bin 2 includes second graphical content rendered at a second pixel density and an over rendered region 250. The over rendered region 250 includes a portion of the first graphical content corresponding to bin 1. The portion of the first graphical content in the over rendered region 250 is rendered at the second pixel density. Bin 3 includes third graphical content rendered at a third pixel density and an over rendered region 252. The over rendered region 252 includes a portion of the first graphical content corresponding to bin 1. The portion of the first graphical content in the over rendered region 252 is rendered at the third pixel density. The portions of first graphical content in the over rendered regions 250 and 252 are different. The portion of the first graphical in over rendered region 250 corresponds to the same graphical content rendered at the first pixel density in bin 1. Similarly, the portion of the first graphical in over rendered region 252 corresponds to the same graphical content (i.e., the graphical content in the corner) rendered at the first pixel density in bin 1.

FIG. 2F illustrates an example of blending multiple over rendered regions with a region of another bin to smooth the transition between the multiple bins. For example, from the example in FIG. 2E, the over rendered region 250 and the over rendered region 252 may be blended with a region of bin 1 to generate a blended region 254 in bin 1. The region of bin 1 is the region that includes the portion of first graphical content rendered at the first pixel density.

The blended region 254 includes a first blended region 256 and a second blended region 258. The first blended region 256 includes first graphical content rendered at two pixel densities (i.e., the first pixel density and the second pixel density in this example) that results in the first blended region 256 having a fourth pixel density that is between the first and second pixel densities. The second blended region 258 includes first graphical content rendered at three pixel densities (i.e., the first pixel density, the second pixel density, and the third pixel density in this example in this example) that results in the second blended region 258 having a fifth pixel density that is between the highest and lowest pixel densities among the first, second, and third pixel densities.

In some examples, the second processing unit 106 may be configured to over render each bin corresponding to a frame. In such examples, the second processing unit 106 may be configured to render each bin with a respective over rendered region for each respective boundary that shares a boundary with a neighboring bin regardless of the pixel density at which the neighboring bin is rendered or to be rendered.

Figure 2G:
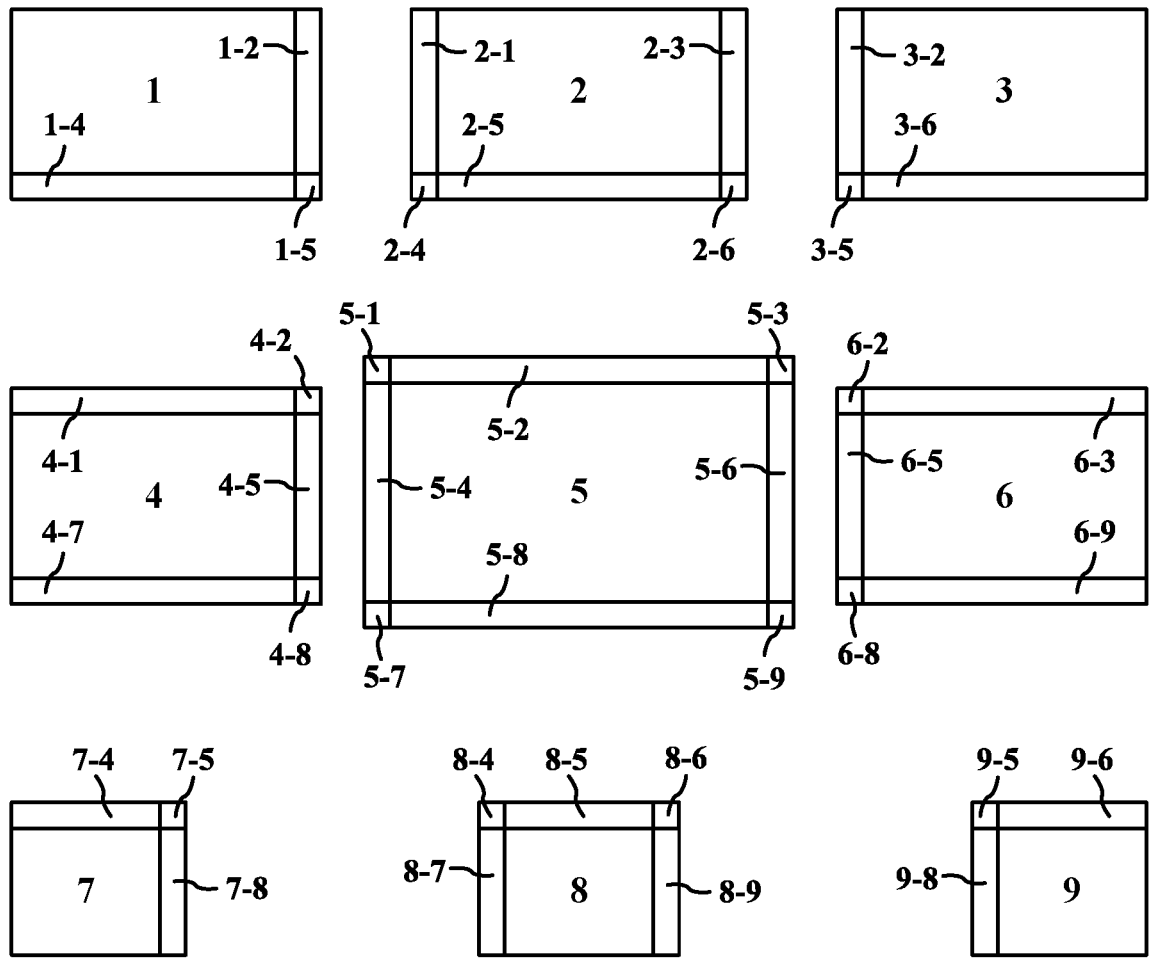

FIG. 2G illustrates an example in which an over rendered region is rendered for each shared boundary of each bin corresponding to a frame. In the example of FIG. 2G, a frame has been divided into 9 bins. The number in the center of each bin represents the bin number. Bin 5 includes fifth graphical content (i.e., graphical content corresponding to bin 5) rendered at a first pixel density. Bin 1 includes first graphical content (i.e., graphical content corresponding to bin 1) rendered at a second pixel density. The second pixel density in the example of FIG. 2G is less than the first pixel density. Bin 2 includes second graphical content (i.e., graphical content corresponding to bin 2) rendered at the second pixel density. Bin 3 includes third graphical content (i.e., graphical content corresponding to bin 3) rendered at the second pixel density. Bin 4 includes fourth graphical content (i.e., graphical content corresponding to bin 4) rendered at the second pixel density. Bin 6 includes sixth graphical content (i.e., graphical content corresponding to bin 6) rendered at the second pixel density. Bin 7 includes seventh graphical content (i.e., graphical content corresponding to bin 7) rendered at a third pixel density. The third pixel density in the example of FIG. 2G is less than the second pixel density. Bin 8 includes eighth graphical content (i.e., graphical content corresponding to bin 8) rendered at the third pixel density. Bin 9 includes ninth graphical content (i.e., graphical content corresponding to bin 9) rendered at the third pixel density.

The regions outside of the bin boundaries constitute the over rendered regions corresponding to each bin. The over rendered region nomenclature of "A-B" is as follow: A stands for the bin number for which the over rendered region was rendered and B stands for the neighboring bin number to which the graphical content in the over rendered region corresponds. For example, rendered bin 1 includes first graphical content rendered at the second pixel density and three different over rendered regions: over rendered region 1-2, over rendered region 1-4, and over rendered region 1-5. The over rendered region 1-2 includes a portion of the second graphical content corresponding to bin 2. The portion of the second graphical content in the over rendered region 1-2 is rendered at the second pixel density. The over rendered region 1-4 includes a portion of the fourth graphical content corresponding to bin 4. The portion of the fourth graphical content in the over rendered region 1-4 is rendered at the second pixel density. The over rendered region 1-5 includes a portion of the fifth graphical content corresponding to bin 5. The portion of the fifth graphical content in the over rendered region 1-5 is rendered at the second pixel density.

As another example, rendered bin 7 includes seventh graphical content rendered at the third pixel density and three different over rendered regions: over rendered region 7-4, over rendered region 7-5, and over rendered region 7-8. The over rendered region 7-4 includes a portion of the fourth graphical content corresponding to bin 4. The portion of the fourth graphical content in the over rendered region 7-4 is rendered at the third pixel density. The over rendered region 7-5 includes a portion of the fifth graphical content corresponding to bin 5. The portion of the fifth graphical content in the over rendered region 7-5 is rendered at the third pixel density. The over rendered region 7-8 includes a portion of the eighth graphical content corresponding to bin 8. The portion of the eighth graphical content in the over rendered region 7-8 is rendered at the third pixel density.

Figure 2H:
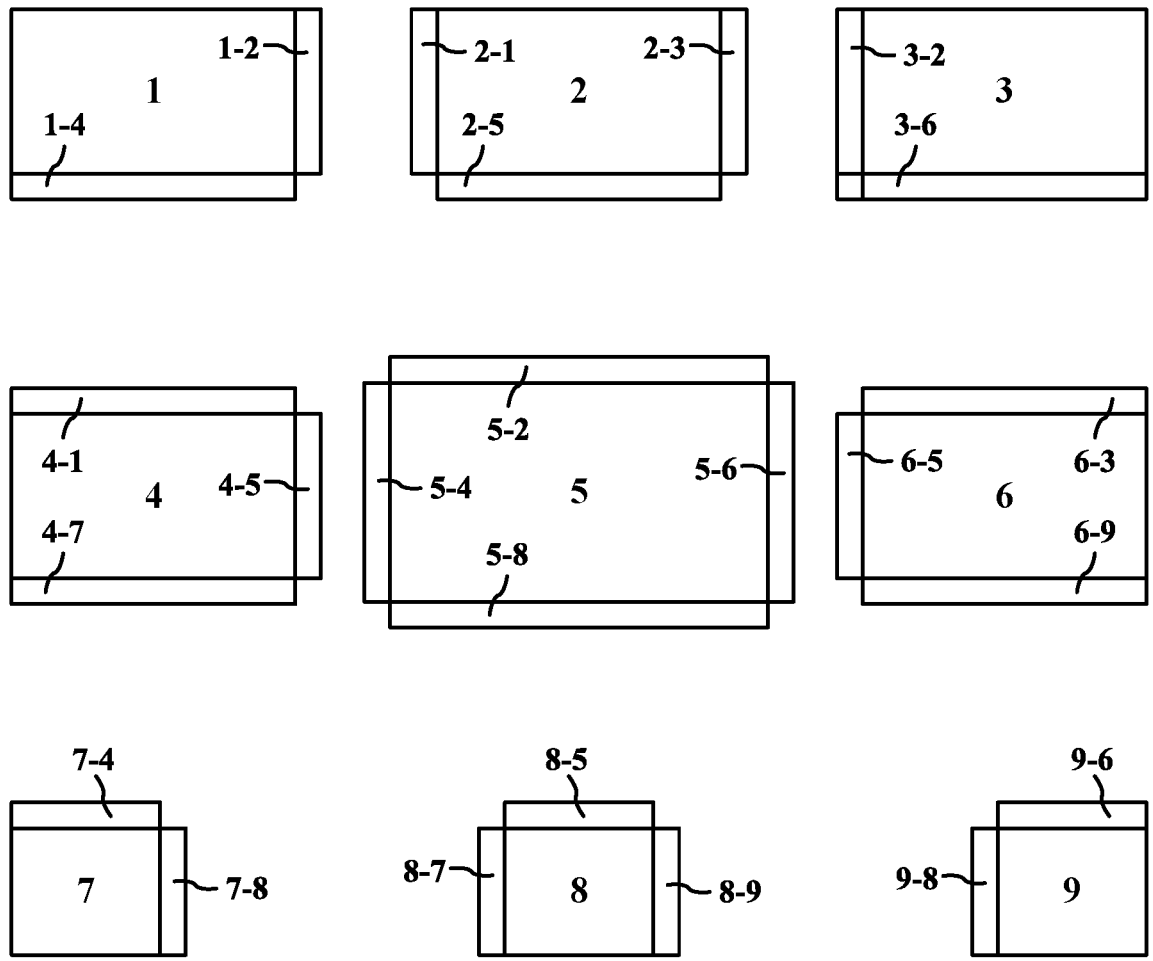
Figure 21:
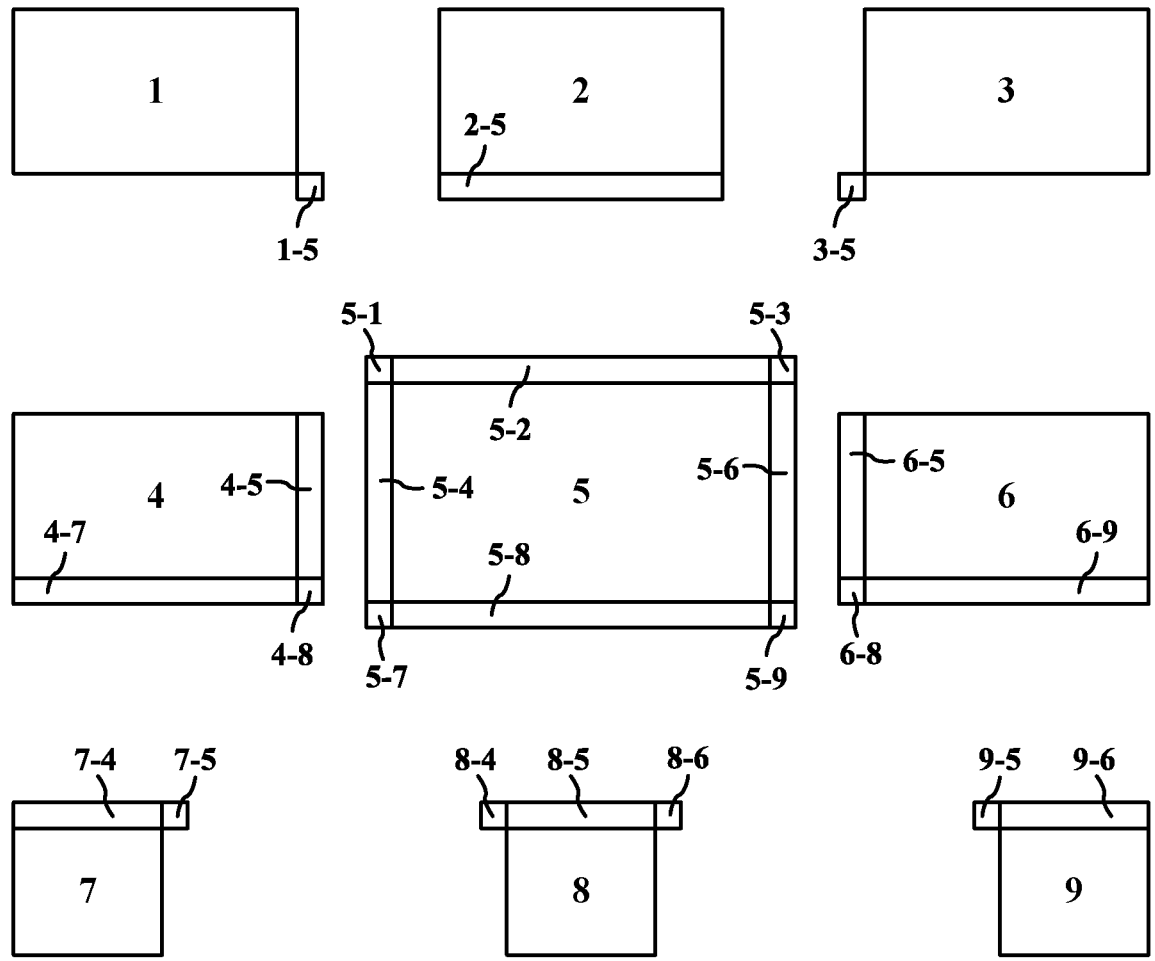

FIG. 2H illustrates the same example shown in FIG. 2G with one difference: shared corners are not over rendered. In some examples, corners may be over rendered, such as shown in the example of FIG. 2G. In other examples, corners may not be over rendered, such as shown in the example of FIG. 2H. By not over rendering the corners, the blending algorithm may be simplified, processing resource consumption may be reduced, and memory consumption may be reduced.

In some examples, the second processing unit 106 may be configured to render each bin with a respective over rendered region only for each respective boundary that shares a boundary with a neighboring bin rendered at or to be rendered at a different pixel density. In such examples, the second processing unit 106 may be configured to reduce the consumption of processing resources because no smoothing is necessary between bins rendered at the same pixel density. In such examples, the second processing unit 106 may be configured to further reduce processing resource consumption and memory consumption based on blending direction. For example, blending may be limited to a direction based on pixel density. As one example, lower pixel density graphical content may be blended into higher pixel density graphical content, but higher pixel density graphical content may not be blended into lower pixel density graphical content. FIGS. 2K and 2L illustrates such an example. As another example, higher pixel density graphical content may be blended into lower pixel density graphical content, but lower pixel density graphical content may not be blended into higher pixel density graphical content. FIGS. 2M and 2N illustrates such an example.

FIG. 2I illustrates an example in which an over rendered region is rendered for each boundary of a bin that shares a boundary with a neighboring bin rendered at or to be rendered at a different pixel density. In the example of FIG. 2I, a frame has been divided into 9 bins. The number in the center of each bin represents the bin number. Bin 5 includes fifth graphical content (i.e., graphical content corresponding to bin 5) rendered at a first pixel density. Bin 1 includes first graphical content (i.e., graphical content corresponding to bin 1) rendered at a second pixel density. The second pixel density in the example of FIG. 2G is less than the first pixel density. Bin 2 includes second graphical content (i.e., graphical content corresponding to bin 2) rendered at the second pixel density. Bin 3 includes third graphical content (i.e., graphical content corresponding to bin 3) rendered at the second pixel density. Bin 4 includes fourth graphical content (i.e., graphical content corresponding to bin 4) rendered at the second pixel density. Bin 6 includes sixth graphical content (i.e., graphical content corresponding to bin 6) rendered at the second pixel density. Bin 7 includes seventh graphical content (i.e., graphical content corresponding to bin 7) rendered at a third pixel density. The third pixel density in the example of FIG. 2E is less than the second pixel density. Bin 8 includes eighth graphical content (i.e., graphical content corresponding to bin 8) rendered at the third pixel density. Bin 9 includes ninth graphical content (i.e., graphical content corresponding to bin 9) rendered at the third pixel density.

The regions outside of the bin boundaries constitute the over rendered regions corresponding to each bin. The over rendered region nomenclature of "A-B" is as follow: A stands for the bin number for which the over rendered region was rendered and B stands for the neighboring bin number to which the graphical content in the over rendered region corresponds. For example, rendered bin 1 includes first graphical content rendered at the second pixel density and over rendered region 1-5. The over rendered region 1-5 includes a portion of the fifth graphical content corresponding to bin 5. The portion of the fifth graphical content in the over rendered region 1-5 is rendered at the second pixel density.

As another example, rendered bin 2 includes second graphical content rendered at the second pixel density and over rendered region 2-5. The over rendered region 2-5 includes a portion of the fifth graphical content corresponding to bin 5. The portion of the fifth graphical content in the over rendered region 2-5 is rendered at the second pixel density.

As another example, rendered bin 7 includes seventh graphical content rendered at the third pixel density and two different over rendered regions: over rendered region 7-4 and over rendered region 7-5. The over rendered region 7-4 includes a portion of the fourth graphical content corresponding to bin 4. The portion of the fourth graphical content in the over rendered region 7-4 is rendered at the third pixel density. The over rendered region 7-5 includes a portion of the fifth graphical content corresponding to bin 5. The portion of the fifth graphical content in the over rendered region 7-5 is rendered at the third pixel density.

Figure 2J:
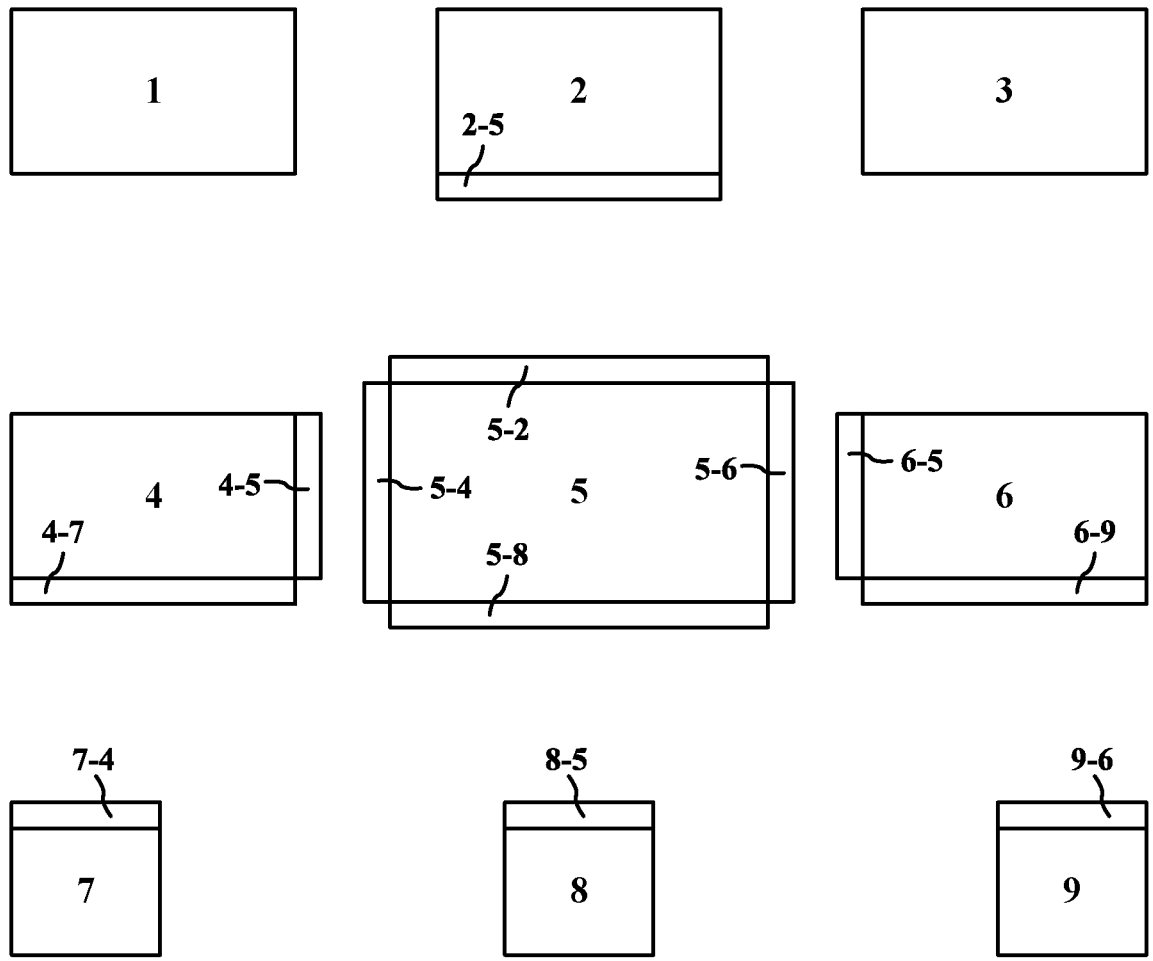
Figure 2K:
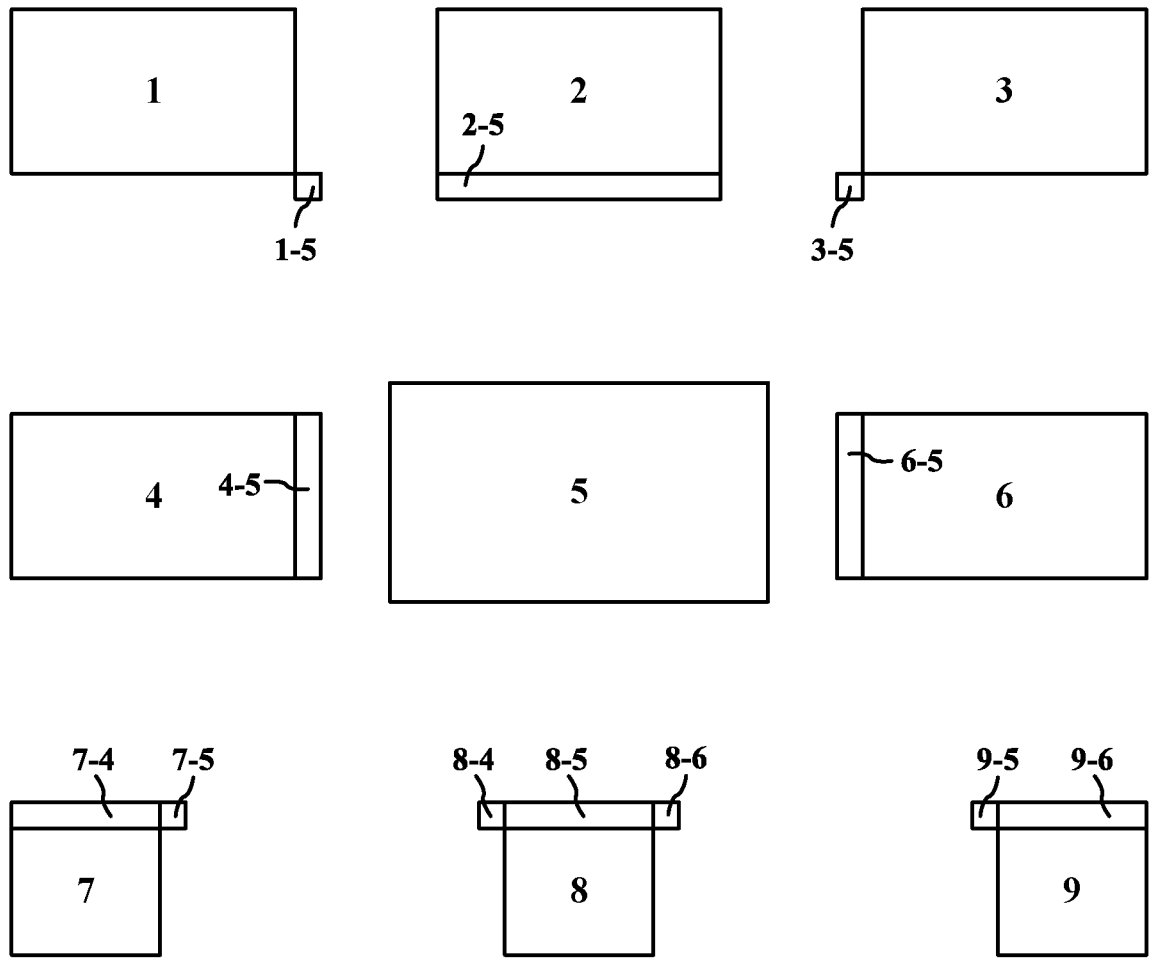

FIG. 2J illustrates the same example shown in FIG. 2I with one difference: shared corners are not over rendered. In some examples, corners may be over rendered, such as shown in the example of FIG. 2I. In other examples, corners may not be over rendered, such as shown in the example of FIG. 2J. By not over rendering the corners, the blending algorithm may be simplified, processing resource consumption may be reduced, and memory consumption may be reduced.

FIG. 2K illustrates the same example shown in FIG. 2I with one difference: the blending in this example is limited such that only lower pixel density graphical content may be blended with higher pixel density graphical content. As such, certain over rendered regions need not be rendered because they will not be used during any blending operation. Otherwise described, FIG. 2K illustrates the example shown in FIG. 2I but with the blending direction of lower pixel density graphical content to higher pixel density graphical content taken into consideration by the second processing unit 106.

FIG. 2L illustrates the same example shown in FIG. 2K with one difference: shared corners are not over rendered. In some examples, corners may be over rendered, such as shown in the example of FIG. 2K. In other examples, corners may not be over rendered, such as shown in the example of FIG. 2L. By not over rendering the corners, the blending algorithm may be simplified, processing resource consumption may be reduced, and memory consumption may be reduced.

FIG. 2M illustrates the same example shown in FIG. 2I with one difference: the blending in this example is limited such that only higher pixel density graphical content may be blended with lower pixel density graphical content. As such, certain over rendered regions need not be rendered because they will not be used during any blending operation. Otherwise described, FIG. 2M illustrates the example shown in FIG. 2I but with the blending direction of higher pixel density graphical content to lower pixel density graphical content taken into consideration by the second processing unit 106.

FIG. 2N illustrates the same example shown in FIG. 2M with one difference: shared corners are not over rendered. In some examples, corners may be over rendered, such as shown in the example of FIG. 2M. In other examples, corners may not be over rendered, such as shown in the example of FIG. 2N. By not over rendering the corners, the blending algorithm may be simplified, processing resource consumption may be reduced, and memory consumption may be reduced.

In some examples, the pixel density at which each bin is to be rendered may be based on whether an eye gaze region overlaps the bin. An eye gaze region may overlap one or more bins. FIG. 3 illustrates an example frame 300 with an eye gaze region overlapping a plurality of bins. In the example of FIG. 3, the frame 300 is divided into 16 bins and bins 6, 7, 10, and 11 overlap with the eye gaze region. Based on information indicative of the eye gaze region, the second processing unit 106 may be configured to determine which bin(s) of bins 1-16 are to be rendered at a first pixel density and which bin(s) of bins 1-16 are to be rendered at a second pixel density. In some examples, the first pixel density may be greater than the second pixel density. In such examples, the second processing unit 106 may be configured to determine that bins 6, 7, 10, and 11 are to be rendered at the first pixel density and determine that bins 1-5, 8, 9, and 12-16 are to be rendered at the second pixel density. In accordance with the techniques described herein, the second processing unit 106 may be configured to smooth the transition between the bins rendered at the first pixel density and the bins rendered at the second pixel density.

In accordance with the techniques described herein, the second processing unit 106 may be configured to render graphical content. For example, the second processing unit 106 may be configured to render a plurality of bins corresponding to a frame. The second processing unit 106 may be configured to over render one or more bins of the plurality of bins as described herein.

As described herein, a blended region may be generated by blending a portion of graphical content rendered at a first pixel density with one or more over rendered regions of graphical content rendered at one or more pixel densities different from the first pixel density. In some examples, the blending of graphical content rendered at different pixel densities may be performed by the second processing unit 106. For example, the second processing unit 106 may be configured to blend the graphical content rendered at different pixel densities while storing the rendered graphical content into the memory 110. In other examples, the second processing unit 106 may be configured to store the graphical content rendered at different pixel densities into the memory 110 without blending. In such examples, the second processing unit 106 or a different processing unit (e.g., the first processing unit 104, the third processing unit 108, or any other processing unit) may be configured to read the graphical content rendered at different pixel densities from the memory 110. The processing unit that reads the graphical content rendered at different pixel densities from the memory may be configured to blend the graphical content rendered at different pixel densities while reading the rendered graphical content from the memory 110.

In some examples, the blending graphical content rendered at different pixel densities may be performed using a gradient, linear interpolation, dithering, another algorithm for blending, or any combination thereof. For example, referring to FIG. 2B, a gradient may be used to generate the blended region. An example of a blend distance is 10 pixels. Line 1 of pixels starts at the boundary and increments into the bin that includes the blended region ending at line 10 of pixels. An example of a gradient with 10 pixels as the blend distance may include: M=90% and N=10% for line 1, M=80% and N=20% for line 2, M=70% and N=30% for line 3, M=60% and N=40% for line 4, M=50% and N=50% for line 5, M=40% and N=60% for line 6, M=30% and N=70% for line 7, M=20% and N=80% for line 8, M=10% and N=90% for line 9, and M=0% and N=100% for line 10. Blending using a gradient results in more blending near the boundary and less blending away from the boundary. Another example of blending may be to select a blend percentage based off a pseudo-random number generated at each pixel. In another aspect, the blend percentage falloff can be non-linear. For example, instead of dropping 10% for each pixel, the drop off may be quadratic or logarithmic.

Figure 4A:
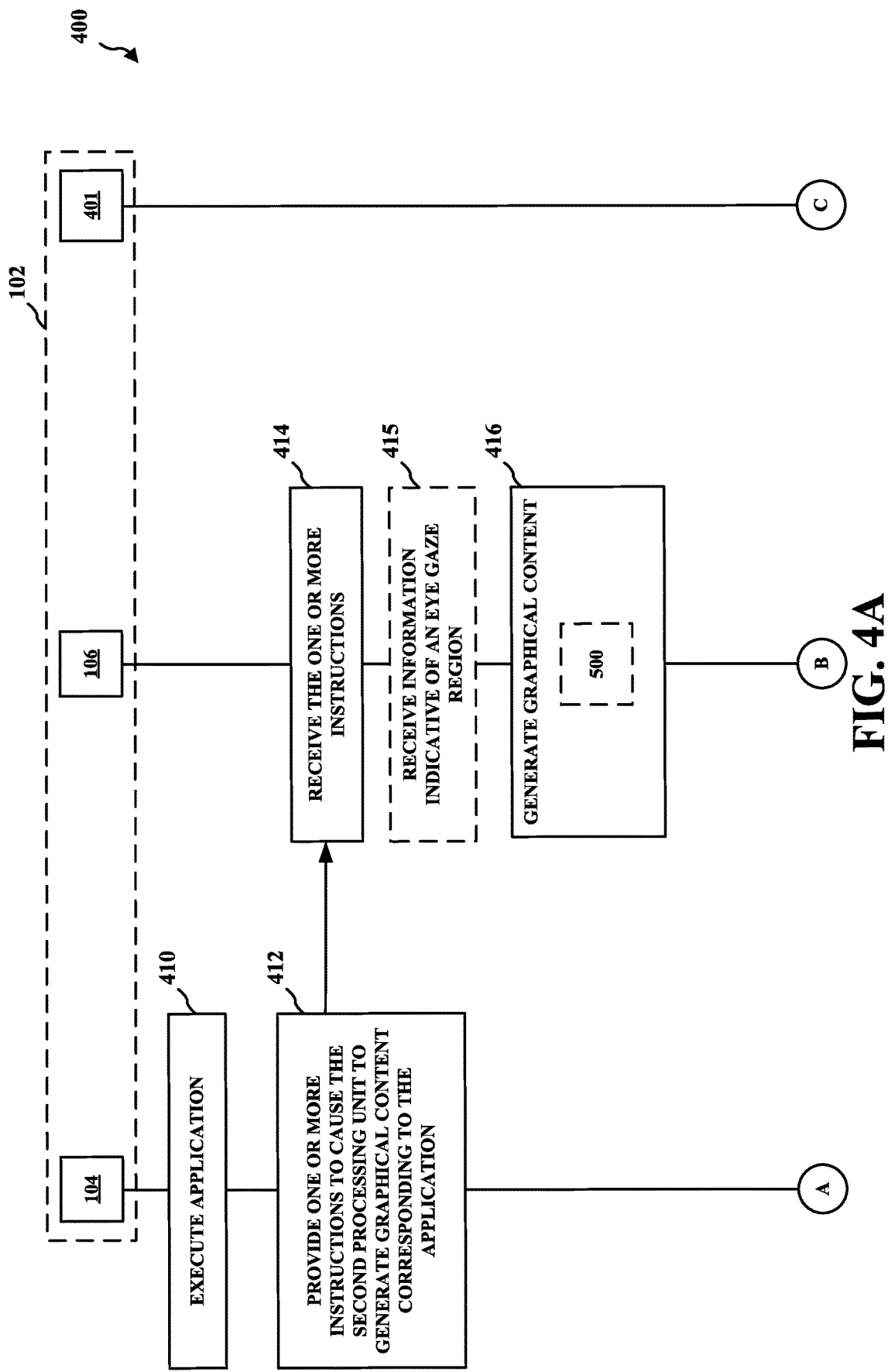
FIGS. 4A-4B illustrate an example flow diagram in accordance with the techniques described herein.
Figure 4B:
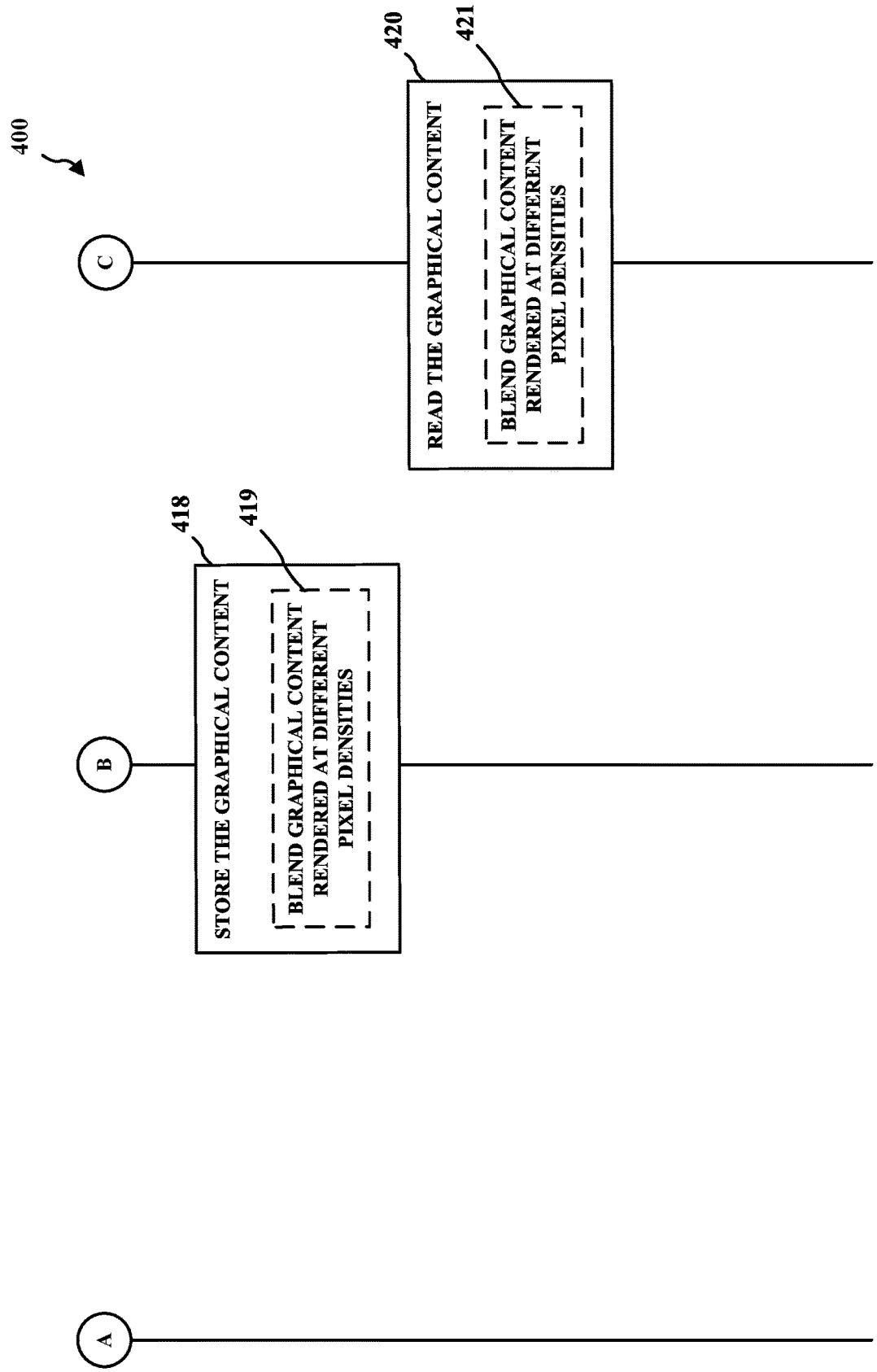

FIGS. 4A-B illustrate an example flow diagram 400 in accordance with the techniques described herein. In other examples, one or more techniques described herein may be added to the flow diagram 400 and/or one or more techniques depicted in the flow diagram may be removed. One or more blocks shown in FIGS. 4A-B may be performed in parallel. Processing unit 401 may be any processing unit, such as the first processing unit 104, the second processing unit 106, the third processing unit 108, or any other processing unit.

In the example of FIGS. 4A-B, at block 410, the first processing unit 104 may be configured to execute an application. At block 412, the first processing unit 104 may be configured to provide one or more instructions to the second processing unit 106 to cause the second processing unit 106 to generate graphical content corresponding to the application. At block 414, the second processing unit 106 may be configured to receive the one or more instructions. At block 415, the second processing unit 106 may be configured to receive information indicative of an eye gaze region. In some examples, the second processing unit 106 may be configured to receive information indicative of an eye gaze region from the first processing unit 104 and/or the eye gaze input device 113-1.

At block 416, the second processing unit 106 may be configured to generate graphical content in accordance with one or more techniques described herein, such as in accordance with the example flowchart 500. The graphical content may include one or more frames. The second processing unit 106 may be configured generate the graphical content based on the one or more instructions received from the first processing unit 104. In examples where the second processing unit 106 receives information indicative of an eye gaze region, the second processing unit 106 may be configured to generate the graphical content based on the one or more instructions received from the first processing unit 104 and based on the information indicative of the eye gaze region.

At block 418, the second processing unit 106 may be configured store the generated graphical content (e.g., in the memory 110) as described herein. In some examples, blending graphical content rendered at different pixel densities may occur while storing the graphical content, as shown by block 419. At block 420, the processing unit 401 may be configured to read the generated graphical content (e.g., from the memory 110) as described herein. In some examples, blending graphical content rendered at different pixel densities may occur while reading the graphical content, as shown by block 421.

Figure 5:
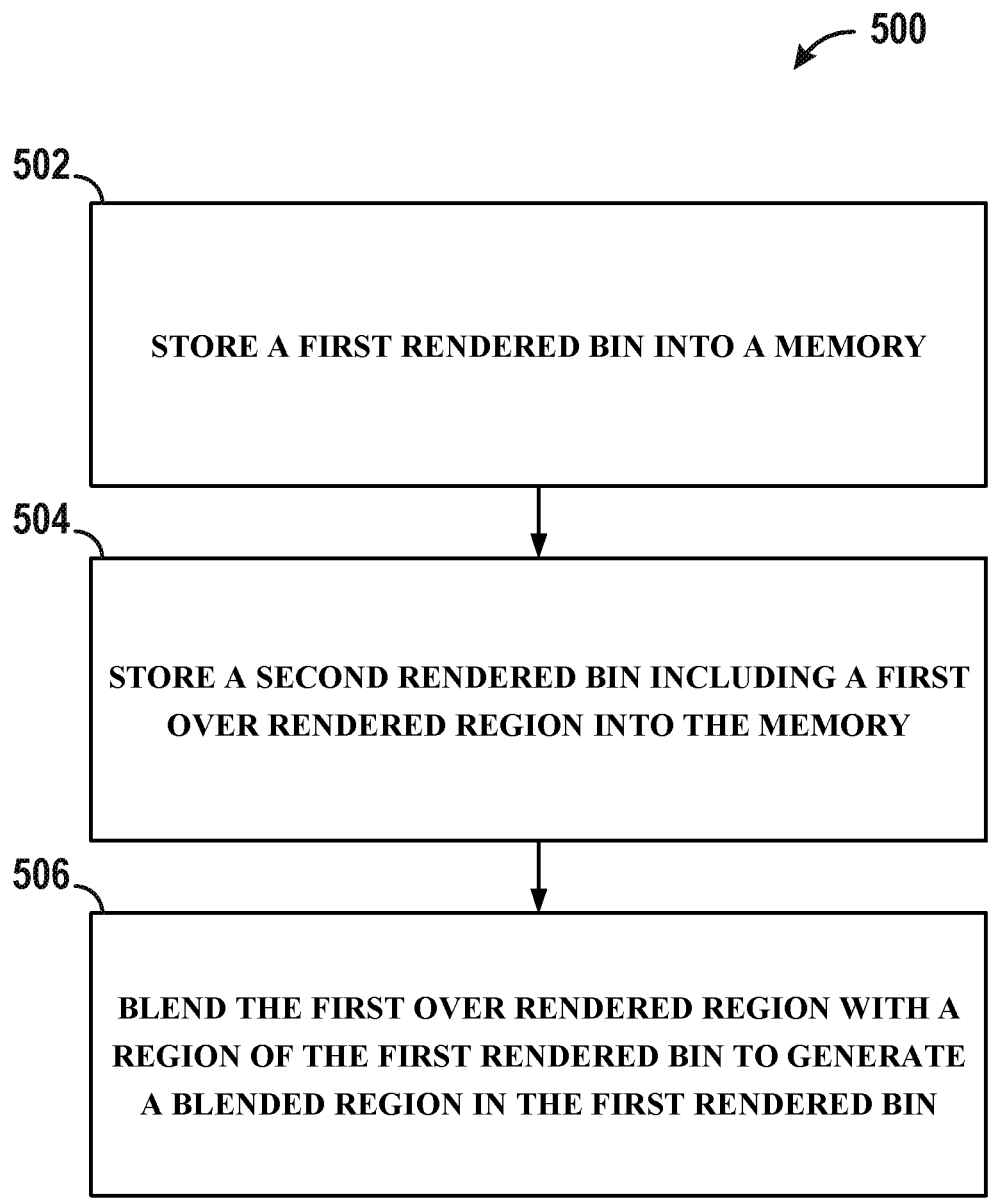
FIG. 5 illustrates an example flowchart of an example method in accordance with one or more techniques of this disclosure.

FIG. 5 illustrates an example flowchart 500 of a method in accordance with one or more techniques of this disclosure. The method may be performed by one or more processing units. In some examples, the method illustrated in flowchart 500 may include one or more functions described herein that are not illustrated in FIG. 5, and/or may exclude one or more illustrated functions. The use of first processing unit and second processing unit with respect to FIG. 5 does not respectively refer to the first processing unit 104 and the second processing unit 106.

At block 502, a first processing unit (e.g., second processing unit 106) may be configured to store a first rendered bin corresponding to a frame into a memory (e.g., memory 110). The first rendered bin includes first graphical content at a first pixel density. The memory may be external to the first processing unit.

At block 504, the first processing unit may be configured to store a second rendered bin including a first over rendered region into the memory. The second rendered bin corresponds to the frame. The second rendered bin and the first rendered bin share a first boundary. The second rendered bin includes second graphical content at a second pixel density and the first over rendered region includes a portion of the first graphical content at the second pixel density. The first over rendered region extends beyond the first boundary. In some examples, the first pixel density is greater than the second pixel density. In other examples, the first pixel density is less than the second pixel density. In some examples, the first processing unit may be configured to render the first rendered bin, and render the second rendered bin including the first over rendered region.

At block 506, the first processing unit or a second processing unit (e.g., a processing unit different from the first processing unit) may be configured to blend the first over rendered region with a region of the first rendered bin to generate a blended region in the first rendered bin. The blended region includes the portion of the first graphical content at a third pixel density. The third pixel density is between the first pixel density and the second pixel density. In some examples, to blend the first over rendered region with the region of the first rendered bin to generate the blended region in the first rendered bin, the first processing unit or the second processing unit may be configured to smooth the first boundary between the first rendered bin and the second rendered bin. In some examples, to blend the first over rendered region with the region of the first rendered bin to generate the blended region in the first rendered bin, the first processing unit or the second processing unit may be configured to perform linear interpolation or dithering to smooth the first boundary between the first rendered bin and the second rendered bin.

In some examples, the first processing unit or the second processing unit is configured to blend the first over rendered region with the region of the first rendered bin to generate the blended region in the first rendered bin while the second rendered bin including the first over rendered region is being stored into the memory.

In some examples, the first processing unit or the second processing unit may be configured to read the first rendered bin and the second rendered bin including the first over rendered region from the memory. The first processing unit or the second processing unit may be configured to blend the first over rendered region with the region of the first rendered bin to generate the blended region in the first rendered bin while the first rendered bin and the second rendered bin including the first over rendered region are being read from the memory.

In some examples, the first processing unit is a graphics processing unit and the second processing unit is different from the first processing unit. In some examples, an SoC may include the first processing unit and the second processing unit.

In some examples, the first rendered bin may include a second over rendered region. In such examples, the first rendered bin and a third rendered bin corresponding to the frame may share a second boundary. The third rendered bin may include third graphical content at a fourth pixel density. The second over rendered region may include a portion of the third graphical content at the first pixel density. The second over rendered region extends beyond the second boundary. In some examples, the fourth pixel density may equal the second pixel density. In other examples, the fourth pixel density may be unequal to the second pixel density.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   storing, by a first processing unit, a first rendered bin corresponding to a frame into a memory, wherein the first rendered bin includes first graphical content at a first pixel density;
   storing, by the first processing unit, a second rendered bin including a first over rendered region into the memory, wherein the second rendered bin corresponds to the frame, wherein the second rendered bin and the first rendered bin share a first boundary, wherein the second rendered bin includes second graphical content at a second pixel density and the first over rendered region includes a portion of the first graphical content at the second pixel density, and wherein the first over rendered region extends beyond the first boundary; and
   blending, by the first processing unit or a second processing unit, the first over rendered region with a region of the first rendered bin to generate a blended region in the first rendered bin, wherein the blended region includes the portion of the first graphical content at a third pixel density, wherein the third pixel density is between the first pixel density and the second pixel density.

2. The method of claim 1, wherein blending the first over rendered region with the region of the first rendered bin to generate the blended region in the first rendered bin occurs while storing the second rendered bin including the first over rendered region into the memory.

3. The method of claim 1, further comprising:
   reading, by the first processing unit or the second processing unit, the first rendered bin and the second rendered bin including the first over rendered region from the memory.

4. The method of claim 3, wherein blending the first over rendered region with the region of the first rendered bin to generate the blended region in the first rendered bin occurs while reading the first rendered bin and the second rendered bin including the first over rendered region from the memory.

5. The method of claim 1, wherein the first pixel density is greater than the second pixel density.

6. The method of claim 1, wherein the first pixel density is less than the second pixel density.

7. The method of claim 1, wherein blending the first over rendered region with the region of the first rendered bin to generate the blended region in the first rendered bin comprises smoothing the first boundary between the first rendered bin and the second rendered bin.

8. The method of claim 1, wherein blending the first over rendered region with the region of the first rendered bin to generate the blended region in the first rendered bin comprises performing linear interpolation or dithering to smooth the first boundary between the first rendered bin and the second rendered bin.

9. The method of claim 1, further comprising:
   rendering, by the first processing unit, the first rendered bin; and
   rendering, by the first processing unit, the second rendered bin including the first over rendered region.

10. The method of claim 1, wherein the first processing unit is a graphics processing unit and the second processing unit is different from the first processing unit.

11. The method of claim 10, wherein a system-on-chip (SoC) includes the first processing unit and the second processing unit.

12. The method of claim 1, wherein the memory is external to the first processing unit.

13. The method of claim 1, wherein the first rendered bin includes a second over rendered region.

14. The method of claim 13, wherein the first rendered bin and a third rendered bin corresponding to the frame share a second boundary, wherein the third rendered bin includes third graphical content at a fourth pixel density, wherein the second over rendered region includes a portion of the third graphical content at the first pixel density, and wherein the second over rendered region extends beyond the second boundary.

15. The method of claim 14, wherein the fourth pixel density equals the second pixel density, or wherein the fourth pixel density is unequal to the second pixel density.

16. A device comprising:
    a memory;
    a first processing unit communicatively coupled to the memory; and
    a second processing unit communicatively coupled to the memory, wherein:
      the first processing unit is configured to store a first rendered bin corresponding to a frame into the memory, wherein the first rendered bin includes first graphical content at a first pixel density;
      the first processing unit is configured to store a second rendered bin including a first over rendered region into the memory, wherein the second rendered bin corresponds to the frame, wherein the second rendered bin and the first rendered bin share a first boundary, wherein the second rendered bin includes second graphical content at a second pixel density and the first over rendered region includes a portion of the first graphical content at the second pixel density, and wherein the first over rendered region extends beyond the first boundary; and
      the first processing unit or the second processing unit is configured to blend the first over rendered region with a region of the first rendered bin to generate a blended region in the first rendered bin, wherein the blended region includes the portion of the first graphical content at a third pixel density, wherein the third pixel density is between the first pixel density and the second pixel density.

17. The device of claim 16, wherein the first processing unit or the second processing unit is configured to blend the first over rendered region with the region of the first rendered bin to generate the blended region in the first rendered bin while the second rendered bin including the first over rendered region is being stored into the memory.

18. The device of claim 16, wherein the first processing unit or the second processing unit is configured to read the first rendered bin and the second rendered bin including the first over rendered region from the memory.

19. The device of claim 18, wherein the first processing unit or the second processing unit is configured to blend the first over rendered region with the region of the first rendered bin to generate the blended region in the first rendered bin while the first rendered bin and the second rendered bin including the first over rendered region are being read from the memory.

20. The device of claim 16, wherein the first pixel density is greater than the second pixel density.

21. The device of claim 16, wherein the first pixel density is less than the second pixel density.

22. The device of claim 16, wherein to blend the first over rendered region with the region of the first rendered bin to generate the blended region in the first rendered bin, the first processing unit or the second processing unit is configured to smooth the first boundary between the first rendered bin and the second rendered bin.

23. The device of claim 16, wherein to blend the first over rendered region with the region of the first rendered bin to generate the blended region in the first rendered bin, the first processing unit or the second processing unit is configured to perform linear interpolation or dithering to smooth the first boundary between the first rendered bin and the second rendered bin.

24. The device of claim 16, where the first processing unit is configured to:
 render the first rendered bin; and
 render the second rendered bin including the first over rendered region.

25. The device of claim 16, wherein the first processing unit is a graphics processing unit and the second processing unit is different from the first processing unit.

26. The device of claim 25, wherein the device is a system-on-chip (SoC), or wherein the device comprises an SoC comprising the first processing unit and the second processing unit.

27. The device of claim 16, wherein the memory is external to the first processing unit.

28. The device of claim 16, wherein the first rendered bin includes a second over rendered region.

29. The device of claim 28, wherein the first rendered bin and a third rendered bin corresponding to the frame share a second boundary, wherein the third rendered bin includes third graphical content at a fourth pixel density, wherein the second over rendered region includes a portion of the third graphical content at the first pixel density, and wherein the second over rendered region extends beyond the second boundary.

30. The device of claim 29, wherein the fourth pixel density equals the second pixel density, or wherein the fourth pixel density is unequal to the second pixel density.

* * * * *